US006860810B2

(12) United States Patent
Cannon et al.

(10) Patent No.: US 6,860,810 B2
(45) Date of Patent: *Mar. 1, 2005

(54) GAMING MACHINES AND SYSTEMS OFFERING SIMULTANEOUS PLAY OF MULTIPLE GAMES AND METHODS OF GAMING

(75) Inventors: Lee E. Cannon, Bozeman, MT (US); John P. O'Donovan, Bozeman, MT (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,850

(22) Filed: Nov. 24, 2003

(65) Prior Publication Data

US 2004/0106446 A1 Jun. 3, 2004

Related U.S. Application Data

(63) Continuation of application No. 09/872,489, filed on Jun. 1, 2001, now Pat. No. 6,652,378.

(51) Int. Cl.[7] .................................................. A63F 13/00

(52) U.S. Cl. ............................ 463/20; 463/26; 463/42; 463/31

(58) Field of Search ......................... 463/16–20, 25–27, 463/30–34, 40–43; 273/138.1, 143 R; 700/90, 91

(56) References Cited

U.S. PATENT DOCUMENTS

| | | | | |
|---|---|---|---|---|
| 4,695,053 A | | 9/1987 | Vazquez, Jr. et al. | 273/143 |
| 4,775,155 A | | 10/1988 | Lees | 273/139 |
| 4,805,907 A | | 2/1989 | Hagiwara | 463/26 |
| 4,856,787 A | * | 8/1989 | Itkis | 273/237 |
| 4,871,171 A | | 10/1989 | Rivero | 273/138 |
| 5,083,271 A | | 1/1992 | Thacher et al. | 700/29 |

(List continued on next page.)

FOREIGN PATENT DOCUMENTS

| | | |
|---|---|---|
| CA | 2285752 | 4/2000 |
| DE | 196 40 860 A1 | 4/1998 |
| EP | 1 063 622 A2 | 12/2000 |
| GB | 1242298 | 8/1971 |
| GB | 2137392 | 10/1984 |
| GB | 2226436 | 6/1990 |
| WO | WO 00/12186 | 3/2000 |

OTHER PUBLICATIONS

Bingo Game Brochure published by Casino Data Systems in 1998.
Jackpot Bingo published by CDS.com printed on Apr. 12, 2001.
Full House Brochure published by Anchor Games in 2000.
Match Reel Game Bonus Description published by IGT.
Jewel in the Crown Brochure published by Barcrest, Ltd.
Jewel in the Crown Brochure published by IGT in 1999.

*Primary Examiner*—Gene Mancene
*Assistant Examiner*—Patrick Buechner
(74) *Attorney, Agent, or Firm*—Marshall, Gerstein & Borun LLP

(57) ABSTRACT

Gaming apparatus and methods of conducting a wagering game of chance. A gaming machine is disclosed which is configured for mutually concurrent play of a plurality of games of chance on a single display screen. A method of conducting a wagering activity includes providing a player with a plurality of differing games of chance, at least some of which are mutually concurrently payable on a single screen display of a gaming device and enabling mutually concurrent play of the plurality of differing games of chance on the single screen display. Various other gaming machine configurations and methods of play related to multiple differing games of chance on a single display screen are also disclosed herein. Networked gaming machines are also disclosed.

41 Claims, 11 Drawing Sheets

U.S. PATENT DOCUMENTS

| | | | | | |
|---|---|---|---|---|---|
| 5,242,163 | A | | 9/1993 | Fulton | 273/85 |
| 5,297,252 | A | * | 3/1994 | Becker | 345/803 |
| 5,393,057 | A | | 2/1995 | Marnell, II | 273/85 |
| 5,411,271 | A | | 5/1995 | Mirando | 273/434 |
| 5,536,016 | A | | 7/1996 | Thompson | 273/269 |
| 5,609,337 | A | | 3/1997 | Clapper, Jr. | 273/138.2 |
| 5,611,730 | A | | 3/1997 | Weiss | 463/20 |
| 5,630,753 | A | | 5/1997 | Fuchs | 463/9 |
| 5,639,089 | A | | 6/1997 | Matsumoto et al. | 273/142 |
| 5,645,486 | A | | 7/1997 | Nagao et al. | 463/27 |
| 5,647,798 | A | | 7/1997 | Falciglia | 463/19 |
| 5,664,998 | A | | 9/1997 | Seelig et al. | 463/20 |
| 5,741,183 | A | | 4/1998 | Acres et al. | 463/42 |
| 5,755,619 | A | | 5/1998 | Matsumoto et al. | 463/19 |
| 5,769,716 | A | | 6/1998 | Saffari et al. | 463/20 |
| 5,779,544 | A | | 7/1998 | Seelig et al. | 463/6 |
| 5,779,549 | A | | 7/1998 | Walker et al. | 463/6 |
| 5,788,573 | A | | 8/1998 | Baerlocher et al. | 463/16 |
| 5,820,460 | A | | 10/1998 | Fulton | 463/13 |
| 5,823,874 | A | | 10/1998 | Adams | 463/17 |
| 5,833,536 | A | | 11/1998 | Davids et al. | 463/11 |
| 5,833,537 | A | | 11/1998 | Barrie | 463/21 |
| 5,848,932 | A | | 12/1998 | Adams | 463/20 |
| 5,851,148 | A | | 12/1998 | Brune et al. | 463/25 |
| 5,882,261 | A | | 3/1999 | Adams | 463/20 |
| 5,890,962 | A | | 4/1999 | Takemoto | 463/20 |
| 5,927,714 | A | | 7/1999 | Kaplan | 273/143 |
| 5,935,002 | A | * | 8/1999 | Falciglia | 463/19 |
| 5,947,820 | A | | 9/1999 | Morro et al. | 463/9 |
| 5,951,397 | A | | 9/1999 | Dickinson | 463/36 |
| 5,980,384 | A | | 11/1999 | Barrie | 463/16 |
| 5,995,146 | A | | 11/1999 | Rasmussen | |
| 5,997,401 | A | | 12/1999 | Crawford | 463/20 |
| 6,001,016 | A | | 12/1999 | Walker et al. | 463/42 |
| 6,019,369 | A | | 2/2000 | Nakagawa et al. | 273/246 |
| 6,059,658 | A | | 5/2000 | Mangano et al. | 463/16 |
| 6,089,976 | A | | 7/2000 | Schneider et al. | 463/16 |
| 6,089,978 | A | | 7/2000 | Adams | 463/20 |
| 6,093,102 | A | | 7/2000 | Bennett | 463/20 |
| 6,120,377 | A | | 9/2000 | McGinnis, Sr. et al. | 463/20 |
| 6,135,884 | A | | 10/2000 | Hedrick et al. | 463/20 |
| 6,159,095 | A | | 12/2000 | Frohm et al. | |
| 6,186,894 | B1 | | 2/2001 | Mayeroff | 463/20 |
| 6,224,482 | B1 | | 5/2001 | Bennett | 463/20 |
| 6,224,483 | B1 | | 5/2001 | Mayeroff | 463/20 |
| 6,231,442 | B1 | | 5/2001 | Mayeroff | 463/20 |
| 6,302,790 | B1 | | 10/2001 | Brossard | 463/20 |
| 6,315,660 | B1 | | 11/2001 | DeMar et al. | 463/16 |
| 6,338,678 | B1 | | 1/2002 | Seelig et al. | 463/17 |
| 6,354,941 | B2 | | 3/2002 | Miller et al. | 463/19 |
| 6,652,378 | B2 | * | 11/2003 | Cannon et al. | 463/20 |
| 2002/0045472 | A1 | | 4/2002 | Adams | 463/19 |

* cited by examiner

GAMING MACHINES AND SYSTEMS OFFERING SIMULTANEOUS PLAY OF MULTIPLE GAMES AND METHODS OF GAMING

CROSS REFERENCES TO RELATED APPLICATIONS

The present application is a continuation of application Ser. No. 09/872,489, filed on Jun. 1, 2001, now U.S. Pat. No. 6,652,378, "Gaming Machines and Systems Offering Simultaneous Play of Multiple Games and Methods of Gaming," and is hereby incorporated by reference herein it its entirety for all purposes.

BACKGROUND OF THE INVENTION

1. Field of the Invention

The present invention relates to gaming devices, systems and methods for playing games of chance. More particularly, the present invention relates to apparatus, systems and methods for displaying and playing multiple games of chance of the same or varying types on a single display screen.

2. State of the Art

Gaming machines such as slot machines, keno machines and video poker machines are popular sources of entertainment that have been a cornerstone of the gaming industry for many years. Generally, the popularity of such gaming machines with players is dependent upon the entertainment value of the machine relative to other available gaming options, as well as the likelihood (or perceived likelihood) of winning money at the machine. As a result, casino operators are constantly looking for ways to enhance the entertainment value and perceived payoff values of the games of chance located within their establishments.

Presently, factors contributing to increased entertainment value of gaming devices are linked to recent advances in microprocessor and communications technologies that enable new and interesting variations in traditional games of chance and gaming devices, including ease in accessing and playing the various games. For example, gaming devices have been networked together for tournament play and linked to the Internet to allow play from remote locations. Today, players may opt to swipe their credit or debit cards in a gaming device to initiate a game or a series of games, and video displays realistically simulate board games and the spin of mechanical reels on a slot machine. While player-enticing advances have been made, the available technology has not been utilized to the fullest extent possible.

Slot machines, while typically among the most lucrative sources of income for a casino, are one type of gaming machine that has not benefited as much as possible from recent technological advances. Traditional slot machines commonly in use are typically stand-alone devices intended to be played by a single player. To initiate play, a player inserts one or more coins or bills therein (or swipes a credit or debit card) and either pushes a button or pulls a lever to begin play. Depending on the final position of the spinning wheels within the slot machine, the machine determines whether or not and how much the player has won.

FIG. 1 is a perspective view of a conventional gaming machine configured as a slot machine 20. Slot machine 20 comprises an exterior housing 22, a glass midsection 24, a main display 26, and an upper glass portion 28. Main display 26 includes windows 30, 32, and 34. In each of windows 30, 32, and 34 is a single reel 36, 38, 40 of the slot machine 20. Spanning windows 30, 32, and 34 are various paylines, including horizontal paylines 42, 44, 46 and diagonal paylines 48, 50. Upon the deposit of an appropriate amount of currency recognized by slot machine 20, one or more of the paylines 42, 44, 46, 48, 50 may be selected by a player, thus allowing for multiple winning combinations.

The upper glass portion 28 and glass midsection 24 typically contain printed information conveying various thematic, instructive, and informative details, such as a paytable display, relating to the operation of slot machine 20. Upper glass portion 28 and glass midsection 24 are also typically backlit so that information printed on them is readily visible to players of the slot machine 20. Play buttons 58 are provided between glass midsection 24 and main display 26 and allow the player to control operation of slot machine 20. A coin acceptor 60, bill acceptor/validator 62, and credit card/casino card input device 64 are provided near play buttons 58 for operation of slot machine 20. A coin tray 66 is provided near the lower third of slot machine 20 to collect coin pay outs resulting from winning plays.

One feature in reel-type slot machines which has been successfully employed to enhance the perceived payoff value of a game is that of multiple paylines, scatter-pay wins or unusually-shaped paylines. To achieve these various winning configurations, the mechanical reels of traditional slot machines have been replaced with video simulations of reels whose available range of indicia (e.g., symbols) are expanded by use of a microprocessor. Such games allow the player to select the number of paylines and to vary the amount of credits wagered on one or more paylines. Winning combinations resulting in pay outs are determined as a result of matching the game's paytable with payline or other winning combination of indicia selected by random number generation. Thus, such machines afford more opportunities to win with each activation of the reels. When placing bets on multiple paylines, the player increases his chances for achieving a winning combination while at the same time betting more money.

In further efforts to make slot play more attractive to casino patrons, systems have been disclosed which offer a plurality of slot machines which are electronically networked together and congregated about a common area. In U.S. Pat. No. 4,805,907 to Hagiwara et al. ("Hagiwara"), a system is disclosed in which a plurality of subordinate slot machines have their outputs connected to a main machine for controlling the game and having a large display thereon. The large display on the main machine is identical to the display shown on each subordinate machine, and allows the players and spectators to observe the progress and results of a game. Hagiwara teaches that the "feeling of togetherness" created by the networked system attracts more players and consequently brings about more profit to the owner of the slot machine.

To increase the opportunity to win, some players prefer to play several slot machines (or gaming machines of other various types) at once. With a higher number of spins per time period of play, the odds of at least one spin turning up a winning combination will be increased. Typically, a player playing two or more gaming machines at once will move back and forth between the machines to deposit money, wager credits, and initiate play. Since the player is playing multiple games at once, the amounts cumulatively wagered by the player will typically be greater. There are several disadvantages, however, to this mode of play. First, players may find moving between several machines inconvenient and ergonomically difficult, particularly when a player desires to engage in an increased rate of play. Second, during peak hours, players on multiple machines may prohibit other casino patrons from partaking in and enjoying games of chance on those "partially" occupied machines. Third, from a casino operator's point of view, multiple machines used for concurrent, but naturally slower play by a single player may take up valuable floor space that could otherwise be used to optimize revenues.

U.S. Pat. No. 5,890,962 to Takemoto ("Takemoto") attempts to solve certain of the aforementioned disadvantages by disclosing a video slot machine display having multiple individual display parts which each make up a 3×3 display of indicia (each display part have nine symbols arranged to simulate three reels). In one exemplary embodiment, each of the display parts has five available paylines. Takemoto discloses that a player can select one or more individual display parts and any number of available paylines for simultaneous play. Takemoto also discloses betting lines extending to symbols spanning across two or more selected individual display. In a further embodiment, Takemoto discloses a method of play that may result in a "big win," wherein each of a predetermined number of continuous display parts in the horizontal, vertical, or diagonal direction are determined to have individual wins. While advantageously providing new types of games and reducing floor space that might otherwise be used for multiple play by a single player, the disclosure of Takemoto is somewhat limited in terms of display options, player options, and in methods of play. For example, the device of Takemoto is restricted to slot machine play; all simulated reels are taught to be activated simultaneously; and the individual display parts are taught to be in fixed positions in an array on the gaming machine display.

In U.S. Pat. No. 6,159,095 to Frohm et al. ("Frohm"), simultaneous multiple game play is extended to a variety of casino games, including video poker, bingo, keno, and reel slot machines. In one embodiment, multiple games of the same type are electronically shown on game boards arranged in a stack and displayed on a touch screen. The number of game boards to be played in the stack is selectable by a player, and winning game boards appear to pop-up from the stack in "cash-register-like fashion." Frohm teaches that the face of any particular game board is viewable by a player upon touching the game board on the touch screen display; when the game board is touched, it slides out from the stack to expose its face.

In another embodiment taught by Frohm, gaming machines for playing reel-type slots or video poker are disclosed which include multiple visual display sections (i.e., multiple areas on the gaming machine each display a game of chance). In the slot machine device of this embodiment, Frohm teaches that each visual display section includes its own set of rotatable reels and that each of the reel sets are simultaneously placed in motion upon pushing a "play" button or pulling a lever. A microprocessor then selects game outcomes for the reels and determines whether a winning combination has been achieved. Frohm further teaches that a primary set of reels on a first display may be stopped first in time and that a winning outcome of less than five symbols from the primary reel set may be automatically carried over to a second or third set of reels, etc, to give a player the opportunity to improve on a winning combination. In this embodiment, Frohm teaches that symbols from a winning combination are applied to a second reel set and that the remaining reels of the second reel set are thereafter stopped and a game outcome determined from the combination of the carried-over symbols and the remaining symbols of the second reel.

A similar scheme of multiple displays and carried-over game elements is disclosed by Frohm for the play of video poker. Similarly to Takemoto, the electronic gaming devices of Frohm provide new types of games and multiplay enhancements while making use of a minimal amount of casino floor space. Frohm, however, is also somewhat limed in the scope of games offered and in available player and display options. In particular, Frohm dots not disclose mutually concurrent play of a plurality of differing games of chance on a single screen display.

U.S. Pat. No. 6,203,428 to Giobbi et al. also teaches an electronic gaming machine for playing multiple games of the same type substantially at the same time. Like one embodiment of Frohm, Giobbi et al. employs pop up game boards, each representing an individual game.

Various other electronic games and their methods and apparatus for use are also well-known in the art. Electronic games include games of chance, games of skill, and games involving both skill and chance. Examples of several patents describing games of chance include U.S. Pat. No. 5,833,536 to Davids et al. (electronic card games), the disclosure of which is hereby incorporated herein by reference, U.S. Pat. No. 5,769,716 to Saffari et al. ("falling symbol" game), U.S. Pat. No. 5,820,460 to Fulton (video poker game), and U.S. Pat. No. 5,947,820 to Morro et al. (slot machine-puzzle game combination).

In order to maintain a casino patron's interest in games of chance, there is a continuing need for gaming machine manufacturers to produce interesting and exciting game variations and attractive enhancements. In addition, casino operators constantly strive to increase profits by maximizing available floor space. Accordingly, there exists a need in the art of new gaming machines permitting concurrent play of multiple games on a single gaming device.

BRIEF SUMMARY OF THE INVENTION

In one aspect, the invention is directed to a gaming method. The method comprises displaying a plurality of game displays on a single display screen of a gaming device at the same time, the plurality of game displays corresponding to a plurality of games. The method also comprises providing a first round of play of the plurality of games, and if one game of one of the plurality of games achieves a first outcome during the first round of play, freezing play of the one game. The method additionally comprises after freezing play of the one game, providing a second round of play of unfrozen games of the plurality of games, and if an other game of the plurality of games achieves a second outcome during the second round of play, freezing play of the other game. Further, the method comprises providing awards based on outcomes of the plurality of games.

In another aspect, the invention is directed to another gaming method. The method includes displaying a first plurality of game displays on a single display screen of a gaming device at the same time, the first plurality of game displays corresponding to a first plurality of games. The method also includes determining first outcomes of the first plurality of games, and providing awards based on the first outcomes. The method additionally includes if a first condition is satisfied, displaying a second plurality of game displays on the single display screen at the same time, the second plurality of game displays corresponding to a second plurality of games. The method further includes determining second outcomes of the second plurality of games if the first condition is satisfied, and providing awards based on the second outcomes, if any.

In yet another aspect, the invention is directed to yet another gaming method. The method comprises receiving a wager, and displaying a first game display of a first game on a single display screen of a gaming device. The method additionally comprises determining a first outcome of the first game, and if a first condition is satisfied, displaying the first game display and a plurality of second game displays on the single display screen at the same time, the plurality of second same displays corresponding to a plurality of second games. The method also comprises determining a second outcome of the first game, and determining first outcomes of the plurality of second games. The method further comprises if a second condition is satisfied, displaying the first game display, the plurality of second game displays, and a plurality of third game displays on the single display screen at the same time, the plurality of third game displays corresponding to a plurality of third games. The method still further comprises determining a third outcome of the first game, determining second outcomes of the plurality of second games, and determining first outcomes of the plurality of third games. Also, the method comprises providing awards based on at least one of the first outcome of the first game, the second outcome of the first game, the third outcome of the first same, the first outcomes of the plurality of second games, the second outcomes of the plurality of second games, and the first outcomes of the plurality of third games.

In still another aspect, the invention is directed to still another gaming method. The method includes receiving a wager from a first person, and displaying at least one locally played game and at least one remotely played game on a single display screen of a gaming apparatus at the same time, wherein the at least one locally played game is played by a first person at the gaming apparatus, and wherein the at least one remotely slaved game is played by a second person at a location remote to the first person. The method also includes determining a value payout associated with at least an outcome of the at least one locally played game.

In another aspect, the invention is directed to another gaming method. The method comprises accepting a wager for initiating play of a plurality of games, the plurality of games including at least a first game and a second game, and displaying the plurality of games on a single display screen at the same time. Also, the method comprises determining at least a first outcome of the first game and a second outcome of the second same, and providing a bonus in response to a combination of at least the first outcome and the second outcome.

BRIEF DESCRIPTION OF THE SEVERAL VIEWS OF THE DRAWINGS

The foregoing and other advantages of the invention will become apparent upon reading the following description of the preferred embodiments and upon reference to the drawings in which.

DETAILED DESCRIPTION OF THE PREFERRED EMBODIMENTS

Generally, the present invention provides new and enhanced gaming machines and methods of using such gaming machines. While the invention is described in terms of certain specific embodiments, it is by no means so limited. Numerous specific details of these embodiments are set forth in order to provide a thorough understanding of the present invention. It will be apparent, however, that the present invention may be practiced without limitation to many of the specific details presented herein.

The present invention may be characterized as a gaming system which allows players to concurrently play multiple games on a single display screen. As used herein, the terms “gaming,” “gaming devices” and “gaming machines” are used to indicate that some form of wagering may be involved and that players may make wagers of value, whether actual currency or some currency equivalent, e.g., token or credit.

As used herein, the term “independently operable” as applied to play of a plurality of games according to the present invention does not exclude one or more games enabling play of one or more other games, or outcomes or partial outcomes of one or more games interacting with outcomes or partial outcomes of one or more other games to, for example, provide an enhanced award or jackpot, a potential for such enhanced award or jackpot, or even to provide an award in a subsequent game related in part to an outcome or partial outcome of a prior game. Instead, “independently operable” merely refers to a game architecture wherein, once a game is in play, the play proceeds to an outcome which, during play, is unaffected by play or an outcome of another game. The outcome, however, of an individual game may be modified by subsequent interaction with another game.

Figure 1:
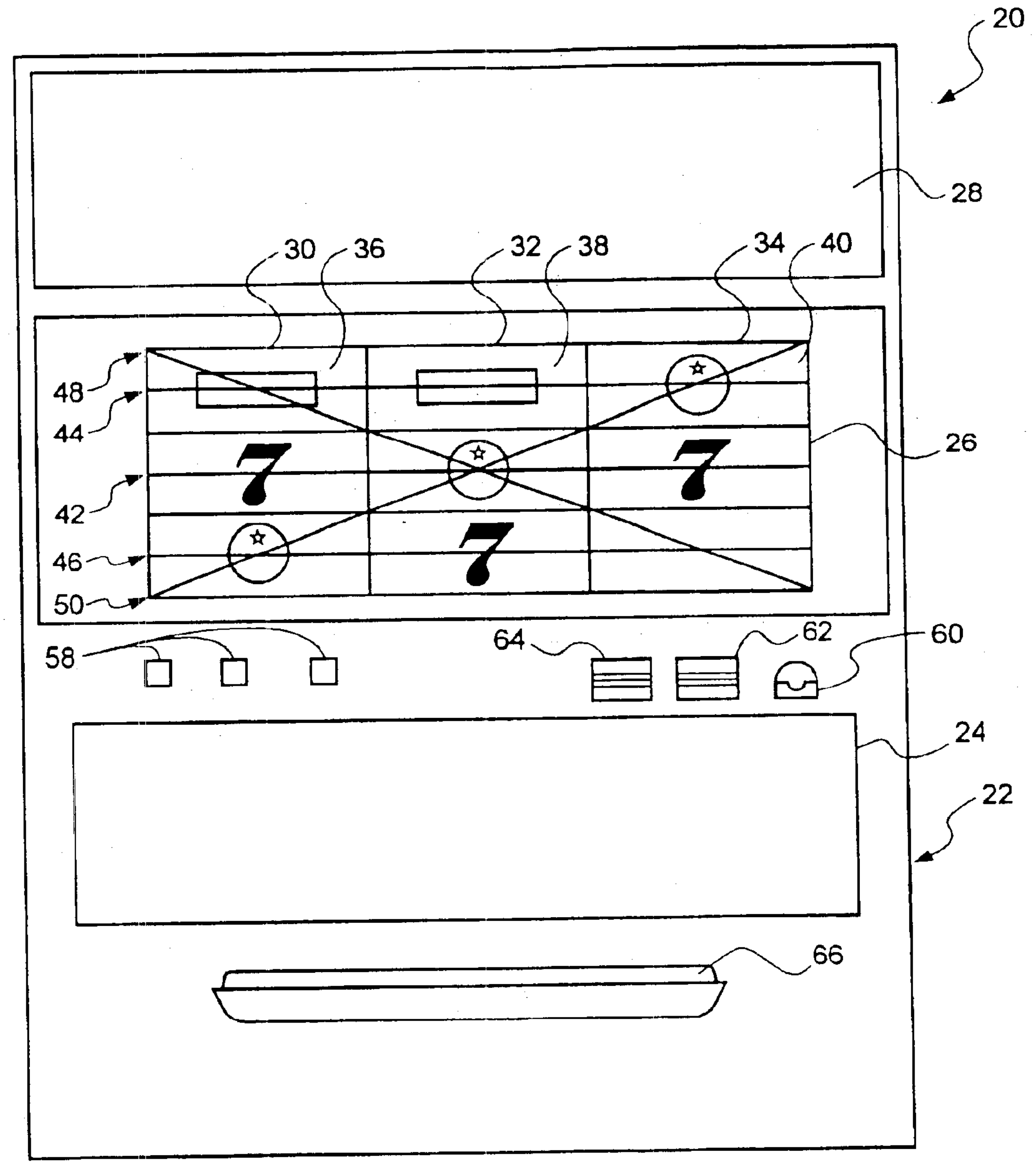
FIG. 1 (PRIOR ART)
FIG. 1 is a schematic of a conventional, prior art electronic gaming machine.
Figure 2:
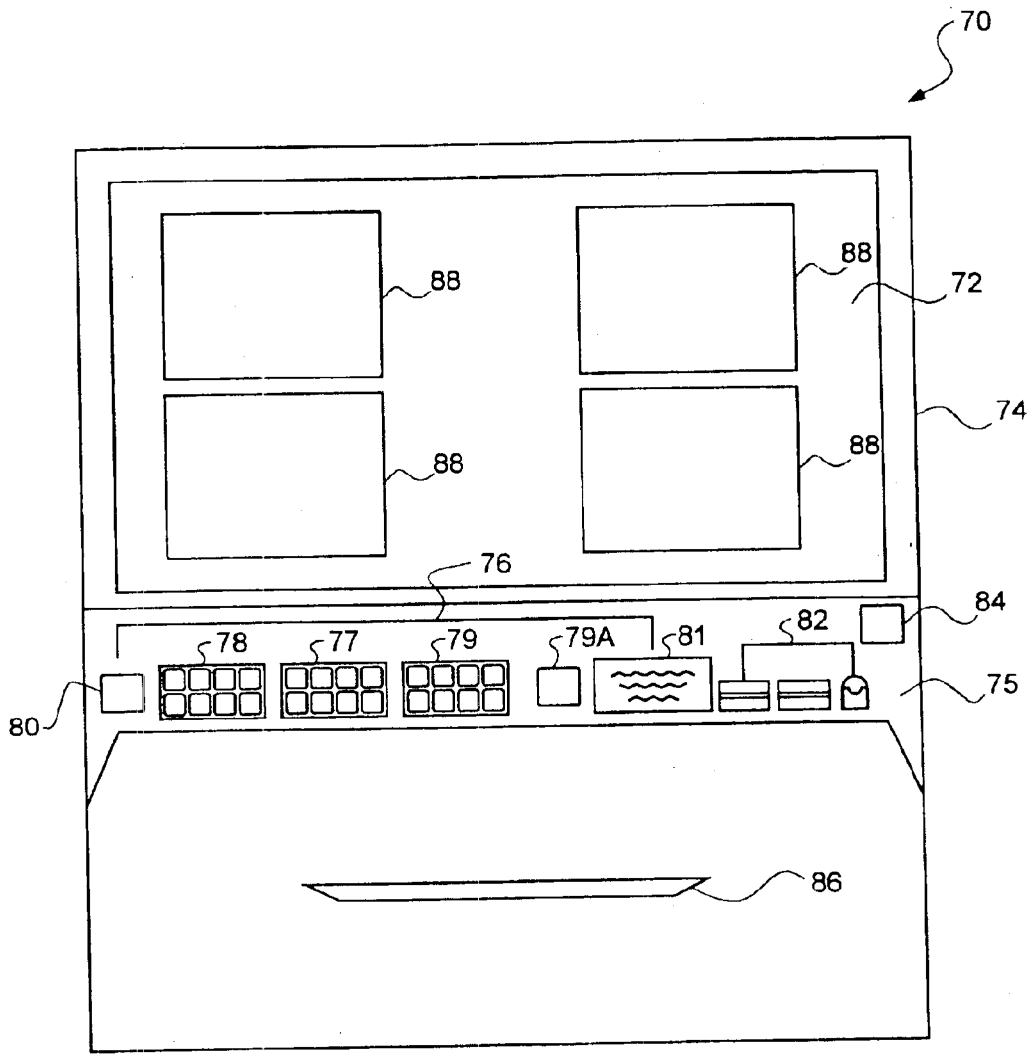
FIG. 2 is a schematic diagram of a preferred configuration of a gaming device according to the present invention.

A first embodiment of the invention is described in relation to the illustration in FIG. 2. FIG. 2 shows a perspective view of a gaming machine 70 having a single display screen 72 supported by an exterior housing 74. Single display screen 72 may typically comprise a high resolution cathode ray tube (CRT) display, although other types of displays such as liquid crystal displays (LCDs), plasma displays, field emission displays (FEDs), digital micro-mirror displays, LCD touch screens, etc. are also contemplated for use with the invention. Single display screen 72 is a physically contiguous screen of a size that allows the simultaneous display of multiple games of chance, and thus may be configured to be relatively larger than the display screen of most conventional gaming machines. Preferably, single display screen 72 is a high resolution screen configured for graphics intensive viewing. By “high resolution” it is meant that the screen has a pixel count of about 90 pixels per square inch or greater. Preferably, single display screen 72 may have a pixel count ranging from about 100 to about 200 pixels per square inch, inch or higher.

The exterior housing 74 of gaming machine 70 is configured with a console 75 having a variety of player input devices 76 thereon which relate to the operation and display configuration of gaming machine 70 in the conduct of a variety of games of chance. Such player input devices 76 may include, for example, game selection buttons 77, play buttons 78, wagering buttons 79, master start button 80, and keyboard 81, as well as other types of devices allowing the gaming machine user to select various games and/or game options. The player input devices 76 may also include other separate player input devices (generically indicated by reference character 76), such as a mouse, touchpad, joystick, rollerball, keypad, or other mechanical or electrical, electronic, magnetic or optical switching or control elements, to facilitate player interaction with gaming machine 70. Single display screen 72 may have a plurality of touch sensitive locations thereon (not shown) as an alternate means for operating and interacting with gaming machine 70 (see U.S. Pat. No. 5,951,397 to Dickinson, the disclosure of which is hereby incorporated by reference herein).

Gaming machine 70 also includes one or more wagering input components 82 of known types, such as a coin acceptor/validator, bill acceptor/validator, and a credit card/debit card/smart card reader, to permit a player to activate and wager on various games of chance to be played. One or more credit meters 84 are also provided to keep track of currency available for wagering. The credit meters 84 may be electronically displayed on a portion of the single screen display 72 or incorporated in an appropriate but separate area on exterior housing 74 as shown. A wager indicator (not shown) is provided in an area of gaming machine 70 clearly visible to a player. A coin tray 86 or other payout component as is known in the art is also included as an element of gaming machine 70. Of course, information relating to the play of the gaming device, such as game play instructions and thematic information, may be displayed on one or more exterior surfaces of gaming machine 70. Various audio and lighting output devices (not shown) may also typically be incorporated into gaming machine 70. Preferably, gaming machine 70 may be configured with network interface apparatus (not shown) such as ports, cable connections, and/or network cards for linking gaming machine 70 to a casino intranet and/or other network (e.g., a local area network (LAN), a wide area network (WAN), the Internet (also referred to as the World Wide Web), etc.).

Gaming machine 70 may be configured for simultaneous, sequential, and/or random play of a variety of games of chance at the same time.

By "simultaneous play" it is meant that a plurality of selected games may be initiated for play at the same time and wherein the image representations for each of the selected games are substantially mutually concurrently displayed on single display screen 72. "Simultaneous play" is referred to interchangeably herein as "mutually concurrent play." After initiation of simultaneous play, game outcomes may be simultaneously, sequentially, or randomly displayed on single display screen 72. Preferably, however, game outcomes for a "simultaneous play" mode are revealed on single display screen 72 in a synchronous fashion (e.g., the game outcomes are displayed one at a time and according to predetermined intervals).

By "mutually concurrently displayed" it is meant that one or more players on gaming machine 70 may view the images of all selected games at once and at a single point in time.

By "sequential play" it is typically meant that a plurality of games initially "mutually concurrently displayed" on single display screen 72 in the manner described above may be initiated for play in an ordered sequence. Preferably, games selected for sequential play have their game outcomes revealed in the same order in which the games were initiated for play. Thus, games selected for "sequential" play may typically initially result in the image representations of the games being displayed mutually concurrently on single display screen 72 and may have only the game outcomes revealed in sequential fashion.

By "random play" it is meant that multiple games selected for play are initiated and/or have their outcomes randomly determined by a microprocessor of gaming machine 70. In "random play," the game images of a plurality of games of chance may typically be mutually concurrently displayed.

Examples of games which may be simultaneously, sequentially, and/or randomly played on gaming machine 70 include, but are not limited to: video spinning reel slot machines, video poker card games, video blackjack games, video keno games, video bingo games, video roulette games, etc. Gaming machine 70 may preferably further be configured for play of a large number of variations of each of the assorted categories (classes) of games of chance. For instance, assorted reel slot machine games having varying configurations can be selected as having, for example, differing indicia (other than the traditional "7-7-7," cherries, bars, bells, etc.), different numbers and/or configurations of paylines, and/or varying numbers of reels. As a comprehensive illustrative example, gaming machine 70 may be adapted for play of any type of game of chance located in the casino in which gaming machine 70 resides or which may be otherwise provided by the property or another site for remote gaming. Of course, the arrangement and function of player input devices 76 are configured appropriately for the types of games that can be played on gaming machine 70. New game play variations may also be provided on gaming machine 70, as is described in more detail below.

Figure 3:
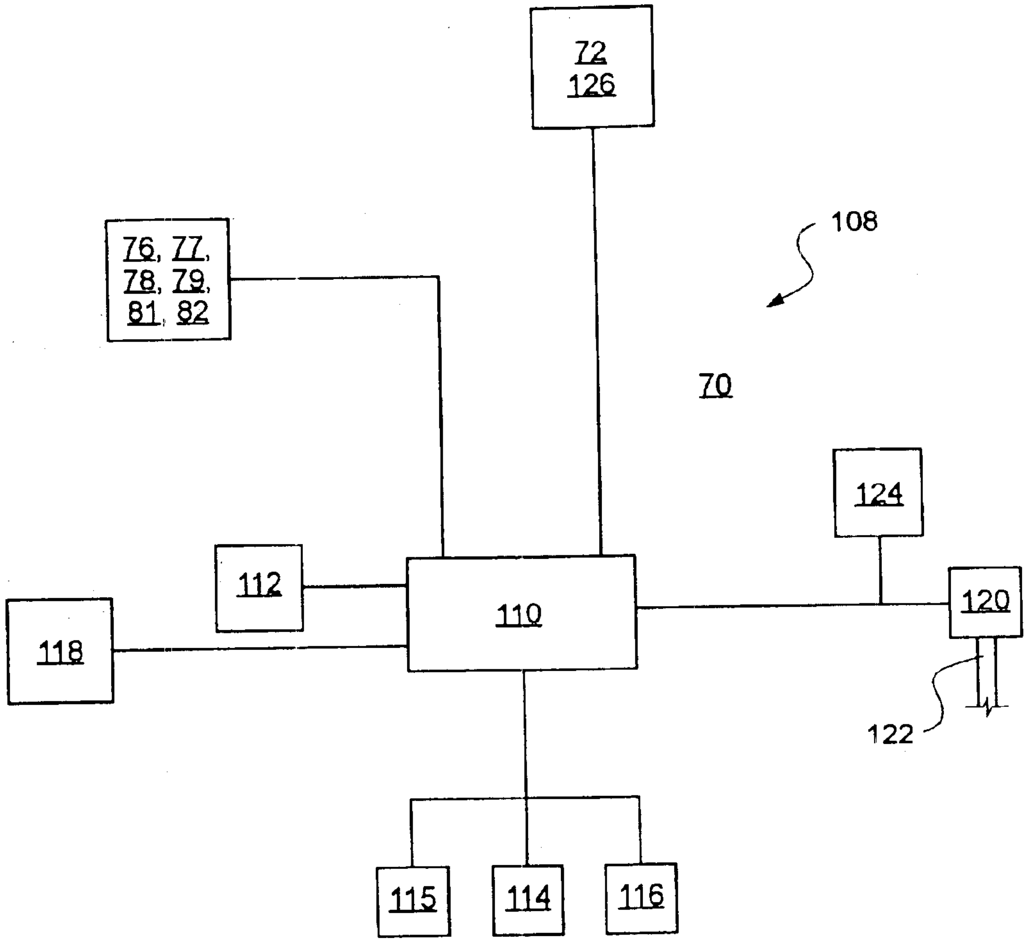
FIG. 3 is a block diagram of an exemplary architecture of a gaming device according to the present invention.

FIG. 3 is a block diagram of an exemplary system architecture 108 for gaming machine 70. Central to the operation of gaming machine 70 is at least one digital microprocessor 110; digital microprocessor 110 containing logic circuits for executing and operating a plurality of differing games of chance. In a currently preferred aspect of the invention, digital microprocessor 110 is configured to display and operate a plurality of mutually concurrently displayed games simultaneously, sequentially, and/or randomly. Digital microprocessor 110 thus contains logic circuits for a variety of functions, including, but not limited to: controlling graphics on single display screen 72, interacting with players, determining game outcomes, sending and processing network information, and the like. Digital microprocessor 110 may preferably support a variety of Internet protocols, such as Simple Mail Transfer Protocol (SMTP), Hyper Text Transfer Protocol (HTTP) File Transfer Protocol (FTP), and the like.

Programs relating to the operation of gaming machine 70 may typically be stored in ROM (read-only memory) 112. The ROM 112 may be detachable or an erasable and programmable read-only memory (EPROM), or an electrically erasable and programmable read-only memory (EEPROM) may be used as the ROM. The system architecture 108 also contains random-access-memory (RAM) 114, a portion of which may preferably be dedicated as graphics memory 115. Video random-access-memory (VRAM) 116 may also be provided for storing and rendering background pictures to be displayed on single display screen 72 (see FIG. 2). A storage medium 118 (e.g, a hard disk or CD ROM media) containing appropriate operating system software, program software, and storage capacity is preferably included to support the various enhanced capabilities of gaming machine 70. Storage medium 118 may be utilized in addition to, or instead of, the ROM 112 firmware for storing the various gaming programs. In this regard, digital microprocessor 110 may be configured for cooperative processing of software from ROM 112, storage medium 118, and any external sources of software (e.g., JavaJ programs or other executable software downloaded from an external file server or computing device linked to a network interface, as hereinafter described).

Digital microprocessor 110 is farther linked to a network interface 120 which provides external bidirectional communication capabilities for gaming machine 70. Network interface 120 may be linked to a casino intranet (i.e., a LAN), a (WAN) and/or the Internet through devices (e.g., servers and routers) and communication links 122 well-known in the art, including, without limitation, twisted-pair wire, coaxial cables, fiber optics, and/or radio wave or other wireless transmission.

In a preferred embodiment, a web server 124 is incorporated into the hardware of gaming device 70 and linked to digital microprocessor 110 and network interface 120 to allow access to gaming machine 70 by remote users through communication links known in the art. Preferably, web server 124 is contained within the exterior housing 74 of gaming machine 70 (see FIG. 2). Of course, web server 124 may be assigned a unique "address" on the intranet, WAN, and/or Web, such as a Uniform Resource locator (URL) address.

With reference to FIGS. 2 and 3, digital microprocessor 110 is in electrical communication with a CRT 126 of single display screen 72, player input devices 76 (such as game selection buttons 77, play buttons 78, wagering buttons 79, keyboard 81, and wagering input components 82), ROM 112, RAM 114, graphics memory 115, and storage medium 118. For simplicity and ease of reference, the term "gaming device" may be used herein from time to time to designate some or all of the other components, elements and features of a gaming machine 70 other than single display screen 72.

Again referring to FIGS. 2 and 3, a player initiates operation of gaming machine 70 by input of a recognized form of currency in one of wagering input components 82. Using one or more of game selection buttons 77, a player may choose to play one or more games of chance of the same type and/of a varying type or class, with the number of available games primarily dependent upon the amount of credits owing to the player. For example, a player may choose to mutually concurrently play one instance of a reel slot machine game, one instance of a video poker game, one instance of a keno game and one instance of a blackjack game by selecting those games using player input devices 76 on console 75 or touch screen locations of single display screen 72. As a second example, a player may use the available player input controls to choose to play one or more instances of the same game type or class (e.g., a player may select several reel slot machine games having the same or varying payline configurations).

Upon selection of the games, a video representation (image) of the various games preferably appears, with each image appearing in an individual game window 88 (FIG. 2) on single display screen 72. Preferably, the video representation of the selected games may be a full (rather than, for example, merely icons or text symbolic of a given game) image representation of the particular game. Thus, the games in individual game windows 88 on single display screen 72 appear to the player in a conventional game form. In other words, the game images of the present invention may be recognized by the player as conventional game images of various games of chance. Therefore, various numbers of slot reels with indicia may be displayed in a game an individual game window 88 for a video slot machine game, a deck of cards or one or more dealt cards may be displayed for a video blackjack game, the appropriate "boards" may be displayed for video bingo and keno, etc.

As used herein, the term "game window" or "gaming window" refers to an individual area on single display screen 72 which contains an electronic image of a single game of chance supported by gaming machine 70. Such gaming windows may be of differing sizes and bordered or unbordered to define a traditional "window."

Preferably, each individual game window 88 is capable of being controlled and operated independently of other individual game windows 88. As such, each individual game window 88 can be generally referred to as independently operable and graphically distinct from game portions of each other individual game window 88. By "graphically distinct" it is meant that the games within the individual game windows 88 may be visually distinguished from one another by, for example, varying degrees of screen illumination intensity. Various interactions between the individual game windows 88 are contemplated, however, by exemplary embodiments described in detail below. A conventional CRT screen may be employed to display a multiplicity of games on single display screen 72 by actuation of digital microprocessor 110 to conduct the games in rapid sequence and then cause the visually perceptible manifestations of the games to raster scan on single display screen 72. For some games, such as card games, game action is in part dependent upon a hand or partial hand dealt by microprocessor 110 and in part on discards and replacement cards dealt responsive to player input. Therefore, a number of concurrently played card games may be in a virtual state of partially played suspension while a player focuses on a particular game requiring his or her input. However, with the high speed of state of the art microprocessors and memory, transitioning from one game to another appears virtually instantaneous to a player, and playing different types of games (i.e., card, reel type and board type games) in a perceptibly mutually concurrent manner is easily effected.

One alternative employing CRT technology is a so-called "picture in picture" CRT display, wherein a smaller and independently-driven picture is caused to appear within the larger display. By using picture in picture technology, the game requiring player interaction is caused to appear on the smaller, picture in picture display while other games not requiring player interaction or which are in a partially played, suspended state are displayed on the major portion of the screen. As a specific example, one portion of a picture in picture screen may be used to display an image generated locally at the gaming machine with which the display is physically associated, while the other portion may be used to stream a video feed, for example, from a remote location such as a "Sports Book" event.

Another alternative game display with multiple windows or display segments may be provided using a flat panel display with discrete, separately controlled subarrays fabricated on a semiconductor substrate or a plurality of arrayed semiconductor substrates, employing, for example, technology developed by Micron Technology, Inc. of Boise, Id. By incorporating multiple windows or display segments in a single display through subarrays at predetermined locations, each of the different subarrays may be activated simultaneously using different signals for each individual gaming window 88. This approach allows gaming machine 70 to display multiple distinct images responsive to distinct signals on a single display, to easily integrate images from multiple sources, and to manipulate one or more of those images without affecting the others.

Figure 4A:
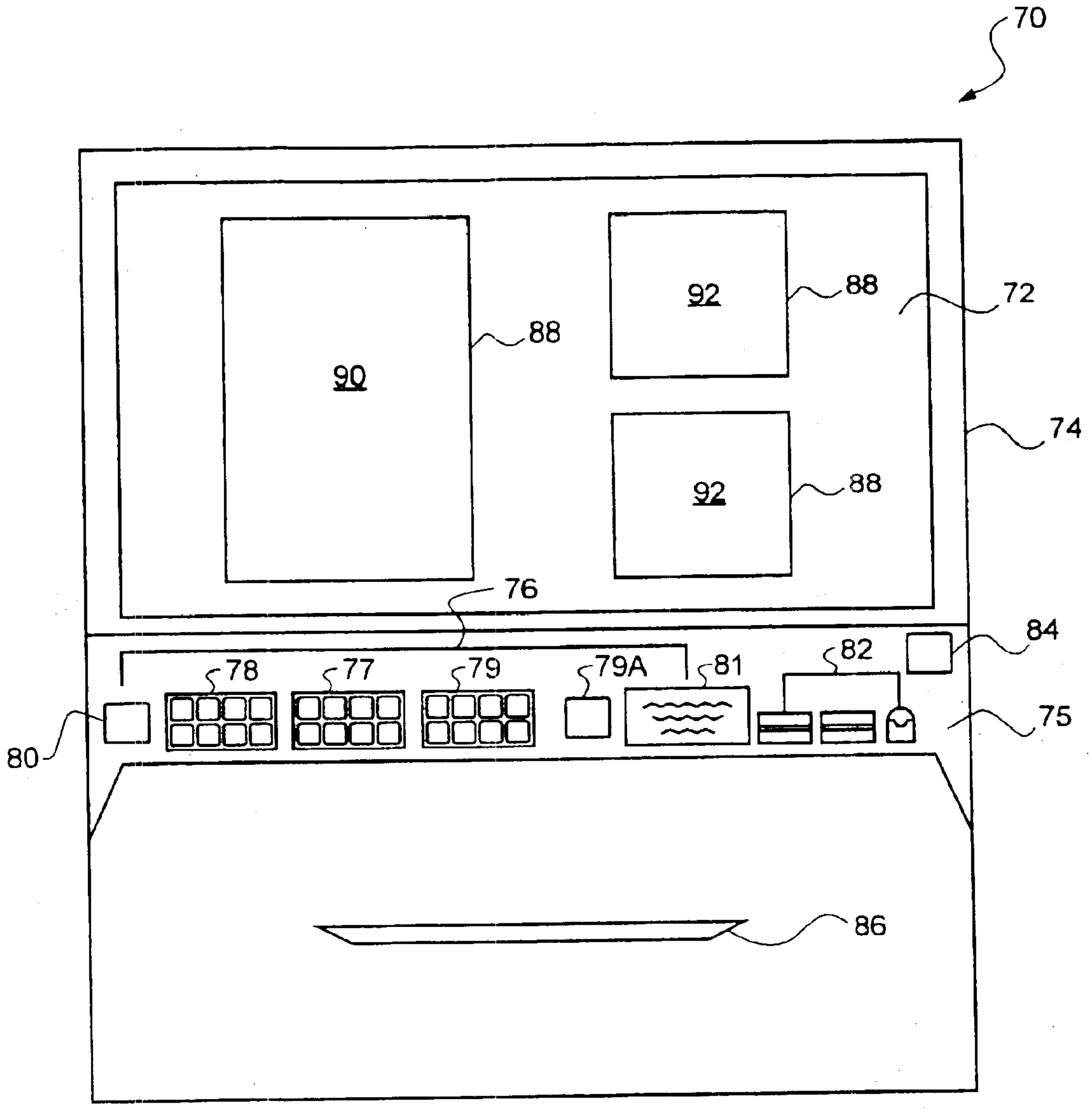
FIGS. 4A–4C are schematic diagrams illustrating various gaming window configurations for gaming devices according to the present invention.

Preferably, each individual game window 88 is arranged on the screen so as to occupy a predetermined area, wherein the displayed games may proportionally span across the substantial majority of single display screen 72 in a non-overlapping array fashion, as shown in FIG. 4A. In the situation of a single game selected for play, the single game image may occupy a relatively large portion of single display screen 72. If multiple games are selected for simultaneous play, the mutually concurrently displayed game images may be relatively smaller than would be the displayed image for a single game on single display screen 72. Thus, higher numbers of selected games may typically result in the images of those games being of relatively smaller proportion in relation to images for lesser numbers of selected games. Background pictures and/or video outputs may also appear and/or be selected to appear on single display screen 72.

The skilled artisan will recognize that gaming machine 70 may also be configured to play multiple instances of only a single class of game (e.g., the class of video poker games), or a single type of game within a game class (a 7-card stud game of video poker game). For example, gaming machine 70 may be configured for the play of multiple games of video poker, the video poker games each being the same type of video poker game (i.e., each video poker game having the same play parameters and rules). Alternatively, gaming machine 70 may be configured to play a wide variety of video poker games, the video poker games being selected from the assorted types of poker games within the class of all known video poker games. The player may then select the number of games to be played, or may be provided with a predetermined number of games that appear on single display screen 72. Many variations of this theme are possible with other games of chance (e.g., reel slot machine games) and are contemplated as within the scope of the invention. It is also contemplated that gaming machine 70 may be configured for optional play of a single game displayed on single display screen 72 or of multiple games, as desired, so that gaming machine 70 will not sit idle when patrons not interested in multiple, concurrent gaming are not present.

A player may also request gaming machine 70 to randomly select a variety of games to be played in simultaneous, sequential, or random fashion. In this embodiment, a player may preselect a number of games to be played, then select a player input device 76 instructing a microprocessor associated with gaming machine 70 to randomly determine the class and/or types of games offered for play in individual gaming windows 88.

In one currently preferred aspect of the embodiment as shown in FIG. 4A, a player is provided with the option to arrange and adjust the size of one or more individual game windows 88 in a desired fashion. For instance, a player primarily interested in viewing the results of a video poker game may choose to have the displayed individual game window 88 of that particular game sized substantially or somewhat larger than other games mutually concurrently displayed. As shown in FIG. 4A, a video poker game window 90 has been increased in size in relation to several (two) reel slot machine game windows 92. Similarly, if numerous games are chosen, a player may selectively adjust the size of one or more individual game windows 88 larger or smaller than the size initially displayed, in accordance with the player's preference. The individual game window 88 may be sized or relocated, for example, by way of player input devices 76 located on console 75 and/or by touch screen locations on single display screen 72.

In a second aspect of this embodiment, a player may be prompted by software associated with gaming machine 70 to select the size and location of each individual game window 88 after game selection has occurred. The available adjustments to the size of individual game windows 88 may be preset in relation to a default setting of a displayable individual game window 88 for ease of player selection. For example, a player may select individual game window sizes which are 25%, 50%, 75%, 125%, or 150% of the originally displayed game window size. Optionally, a player may select a desired individual game window 88 of any desired size, for example, by keyboard 81 entry or other player input devices 76. To reset a game to the original (default) game window size, a player may be provided with a 100% sizing option or the opportunity to switch to "default" settings. Automatic enlargement of individual game windows 88 containing winning game outcomes is also contemplated by the invention.

Figure 4B:
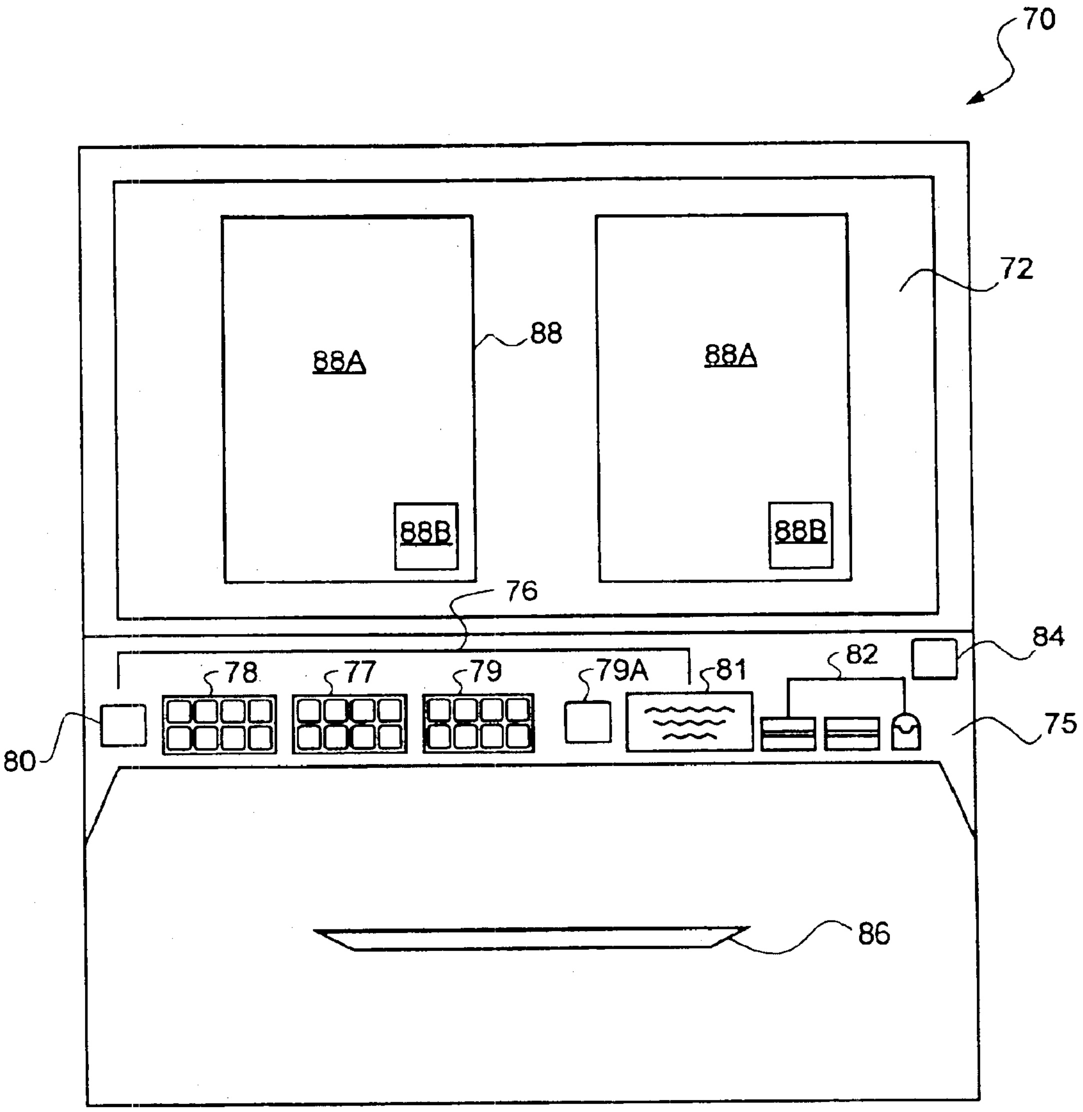

In yet another aspect of the embodiment (shown in FIG. 4B), a plurality of individual gaming windows 88 may be provided with one or more selected individual gaming windows 88*a* occupying substantially all of the display area on single display screen 72, with other selected individual gaming windows 88*b* appearing as relatively smaller individual windows within the larger individual gaming windows 88*a*. The display of this embodiment would thus comprise a relatively smaller individual gaming window 88*b* image located within a relatively larger individual gaming window 88*a* image. Preferably, these "image within an image" or "picture in picture" individual gaming windows 88*a* and 88*b* may be adjusted by a player to match personal preferences. In an alternative aspect of the embodiments in FIGS. 4A and 4B, images of selected games of chance may be mutually concurrently displayed and played in individual game windows 88 having a fixed size and arranged in a fixed predetermined array pattern on single display screen 72. In this embodiment, single display screen 72 may be subdivided in a predetermined fashion for optimal display of the number of games selected. For example, if four games of chance were selected for play, single display screen 72 can be subdivided into quadrants of equal size with selected individual games displayed in each quadrant, as is shown in relation to FIG. 2. Similarly, two games may occupy proportional halves of single display screen 72 and three games may be arranged, for example, in a horizontal linear manner, or in a "pyramid" fashion. Although not preferred, separate individual game windows 88 may also be formed on multiple separate display screens using one or more CRTs.

Figure 4C:
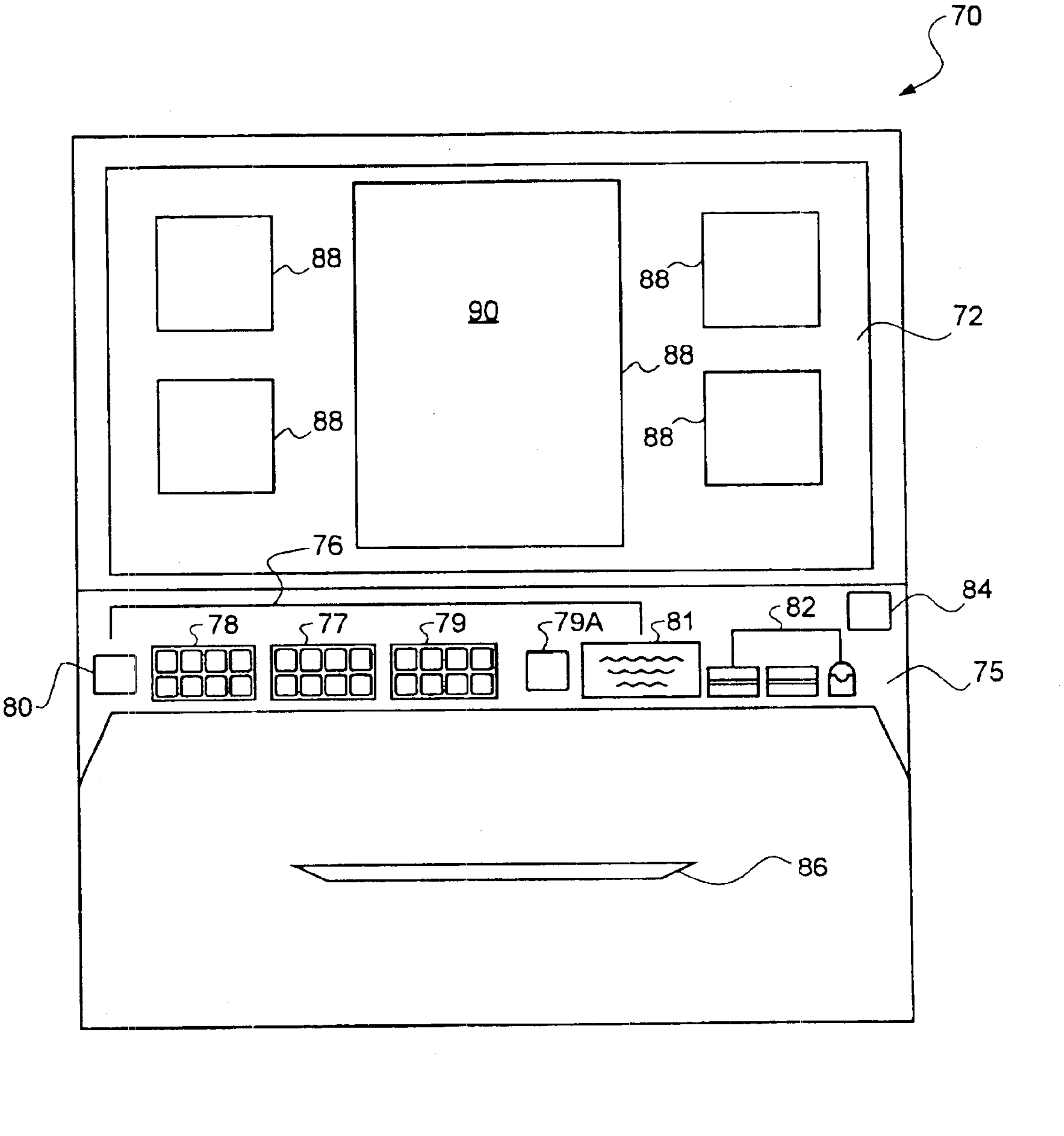

In an additional aspect of the embodiment, a player may opt to relocate or move one or more individual game windows 88 to desired locations on single display screen 72 by, for example, "dragging" the individual game windows 88 using touch screen controls and/or the player input devices 76 (e.g., by "clicking and dragging" with a mouse) on console 75 (FIG. 4C). In FIG. 4C, the enlarged video poker game window 90 of FIG. 4A is shown as centrally relocated on single display screen 72, with smaller individual game windows 88 relocated to more peripheral areas of single display screen 72.

In a still further aspect of the embodiment, single display screen 72 may include one or more "informational" windows 94 (FIG. 4D) for displaying information associated with the gaming machine or with the casino, such as information regarding impending gaming tournaments, entertainment events, special events, and the like, and/or advertising or promotional information from other vendors. Preferably, gaming machine 70 may include an informational window 94 which provides a recent play history for that machine. For example, one or more of the following may be displayed: length of time since last jackpot, size of last jackpot, frequency of jackpots, jackpot trends, or other win information. Depending upon a given player's personality and preferences, a player might be drawn to a given gaming machine because it has not recently paid out and is thus "due to hit," or has paid out in the recent past and is thus on a "hot streak."

Informational windows 94 may be configured to provide a constant stream of information or may be configured to "pop up" to alert a player, for example, of an impending gaming tournament or other special event.

Figure 4D:
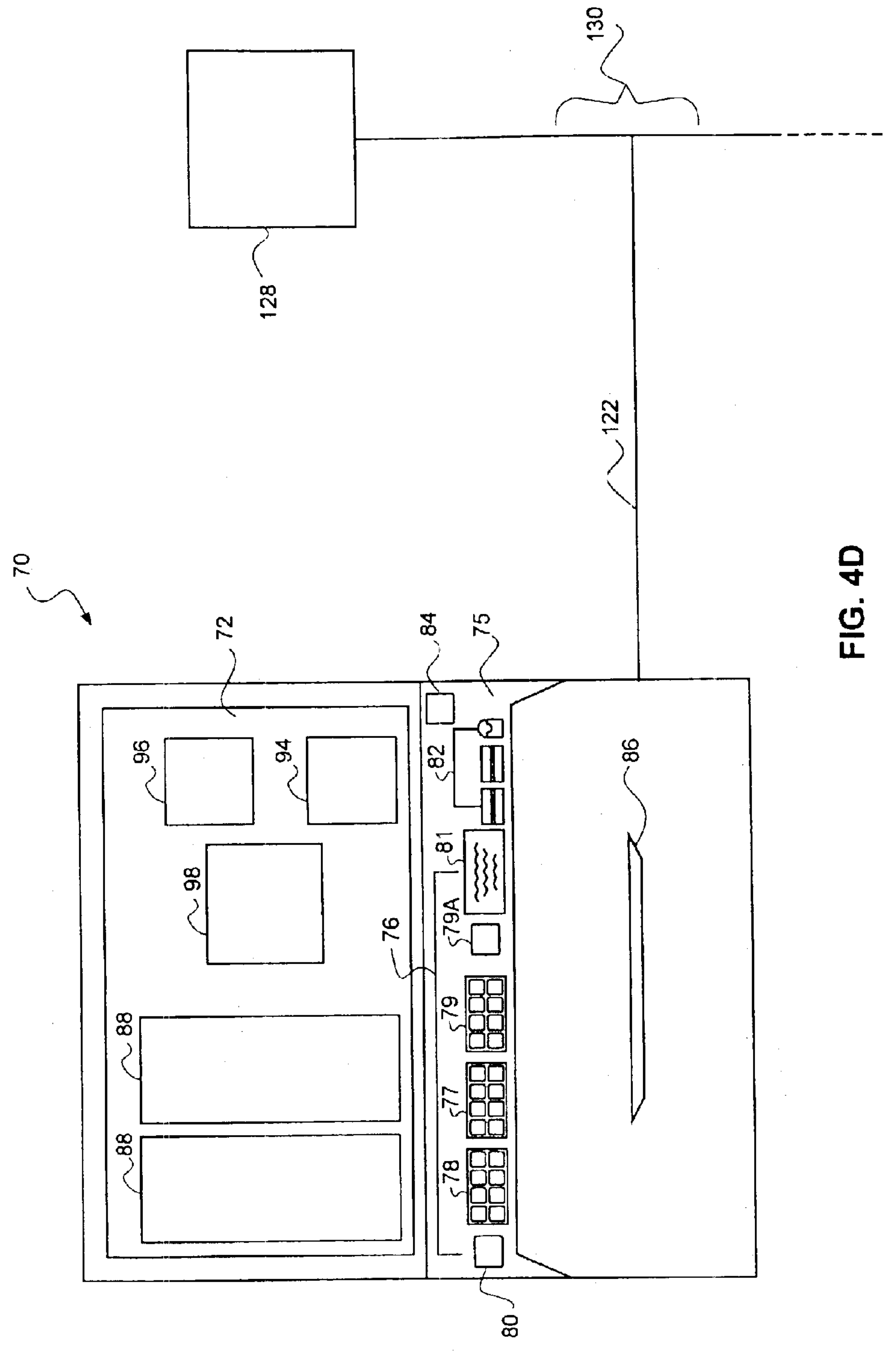
FIGS. 4D–4F are schematic diagrams illustrating the present invention in various networked configurations and including various gaming window configurations for use in the networked configurations.

With further reference to FIG. 4D and FIG. 3, one or more "player progress" windows 96 may also be provided in which various gaming statistics related to the current player's gaming play are displayed, including, but not limited to: a player's average number of wins per individual gaming window 88, total amounts won, amounts won in credit meter fashion per individual gaming window 88, number of plays per time interval, the player's winning percentage in relation to a casino average for a particular class or type of game, and the like. In this embodiment, casino-based gaming statistics can be retrieved from a server 128 on a casino intranet 130 using commands from digital microprocessor 110 through network interface 120 and associated communication links 122 (see also FIG. 4E).

Gaming machine 70 may also include one or more "special event" windows 98 (FIG. 4D) containing an interactive display relating to impending or concurrent gaming events associated with the casino in which the gaming machine resides, such as the opportunity for "Sports Book" or "Race Book"-type wagers. In this aspect of the invention, player input devices 76 allow player interaction with the casino through special event window(s) 98 on single display screen 72. As a nonlimiting example, a player may be provided a menu displayed on a special event window 98; the menu allowing the player to review available casino gaming events, view the betting odds associated with each event, and to select one or more gaming events in which to wager.

Special event window 98 may also display "real-time" video streams, hyper text, or other information associated with a gaming event. Preferably, a player may be able to view one or more special events, such as a sporting events, live (e.g., in "real-time" through cable or satellite reception), or at a later time by a video recording of the event, through a video feed displayed on a special event window 98. Video recordings of an event may preferably be stored on, or accessed by, a server 128 on a casino intranet 130, which may in turn be accessed by a microprocessor 110 of gaming machine 70 through a network interface (not shown). News summaries (e.g., wire reports, casino-generated reports, etc.) regarding the event(s) may also be provided through a special event window 98 by means of network communications links known in the art.

To wager on the various gaming events offered through special event window 98, a player may deposit the appropriate sums with the casino using wagering input components 82 (FIG. 4E) or by dedicating available credits on gaming machine 70 using appropriate player input devices 76. In this aspect of the invention, a network server 133 linked to gaming machine 70 through a communication link 122 of a casino intranet 130 may verify deposited amounts and register the player's wager against the particular event (s). An embedded web server 124 on gaming machine 70 (FIG. 3) may be used to receive, request, and interact with gaming events sponsored by the casino. For example, special event window 98 may be associated with embedded web server 124 and configured with a graphical user interface (e.g., as a presentation layer) having a Java-based menu or form (e.g., using CGI script) for selecting and wagering on a variety of gaming events supported by the casino or another gaming establishment. Further details of the operation of an embedded web server on a gaming machine 70 in accordance with the principles of the present invention are described below with regard to FIGS. 3 and 5.

Winnings may be paid in a variety of ways selectable by the player, including payouts from gaming machine 70 in the form of credits and/or currency, currency credited to an account provided by the player (e.g., a credit card, debit card, smart card account or other personal account), or by casino operator, etc.

Figure 4E:
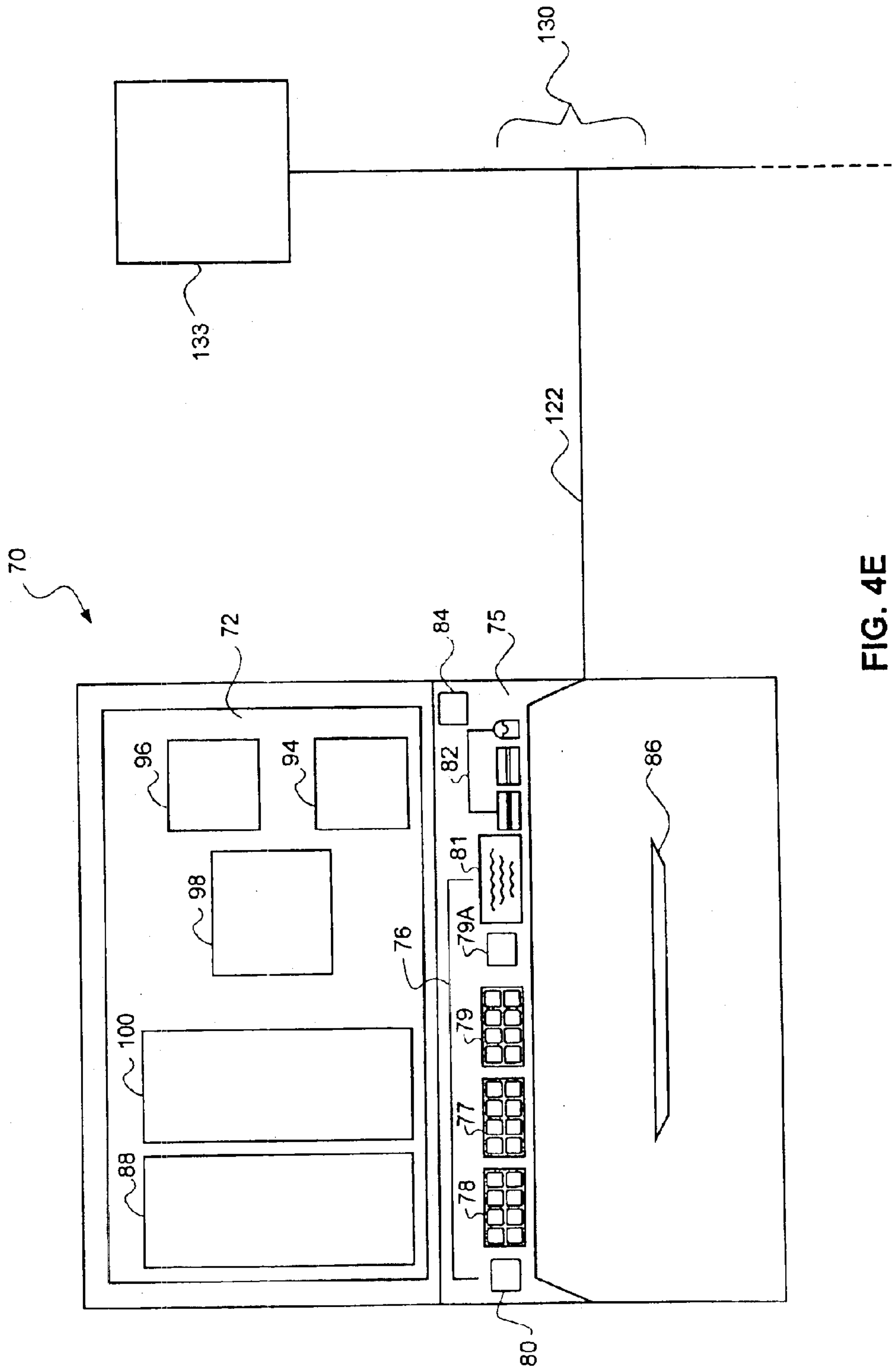

In an additional aspect of the invention shown in FIG. 4E, gaming machine 70 is provided with one or more "tournament" windows 100 on single screen display 72 for play in one or more casino-sponsored or sanctioned tournament games of chance of the same or of varying types and/or classes. For example, a player may elect to open two tournament windows 100 for concurrent play in two different tournaments of two different game classes which are scheduled to occur within the same or a similar time frame (e.g., a keno tournament and a reel slot machine tournament). Depending on the tournament rules, a player may also concurrently open two or more tournament windows 100 for multiple entries and concurrent play within the same gaming tournament (e.g., a reel slot machine tournament). The multiple simultaneous tournament games may be mutually concurrently displayed in tournament windows 100 as smaller versions of a standard tournament game, each smaller version operating independently of the other versions. In this regard, a digital microprocessor of gaming machine 70 may be configured for tournament play of a wide variety of tournament games, games and may be supported with game software stored on ROM or hard storage media on the gaming machine 70, and/or by game software found on a remote file server to which gaming machine 70 is operably linked.

In another aspect of the invention, a player may initiate a tournament (e.g., a casino-wide tournament or a tournament among players in a number of different casinos) by having gaming machine 70 direct a message to other networked machines of the player's tournament interests. Likewise, players on other gaming machines of the same or assorted types may "poll" a player on gaming machine 70 for the player's potential interest and entry in a player-initiated tournament.

Still referring to FIG. 4E, tournament window(s) 100 are linked via a microprocessor 110 (FIG. 3), communication links 122, and a network interface 120 (FIG. 3) to a casino network 130 which is hosting or participating in the tournament. Casino network 103 may be a casino intranet, WAN (e.g., a network of associated casinos and associated gaming machines to which gaming machine 70 is be bidirectionally interconnected), or even a nationwide or international grouping of casinos linked together, for example, by the Internet. In each of the casino intranet 130 embodiments, a linked, centralized network server 133 preferably initiates tournaments, collects gaming data from each gaming machine 70, oversees winning game outcomes, and determines tournament winners.

In a related aspect of the embodiment, the centralized network server 133 functions as an application server and database server in a two-tier architecture. Here, a player electing to participate in a tournament would receive tournament software downloaded from centralized network server 133, with the centralized network server 133 then monitoring the tournament results from participating gaming machines. The centralized network server 133 may also provide various intelligent functions associated with tournament play, such as providing software and monitoring functions in furtherance of bonus rounds for players with certain game outcomes or certain levels of winning.

In a preferred aspect of the embodiment, a player is provided with information regarding impending tournaments through informational window 94 or through an otherwise inactive tournament window 100. The tournament information can be provided, for example, by HTML (e.g., hypertext), email, or other communication protocol transmitted to a network interface on gaming machine 70. An embedded web server 124 on gaming machine 70 (FIG. 3) may be used to receive tournament information, request tournament information, and interact with centralized network server 133 (acting as an information server) in the manner previously described with regard to the informational windows disclosed in FIG. 4D.

Still referring to FIG. 4E, tournament windows 100 are preferably configured for mutually concurrent operation with one or more of individual gaming widows 88, informational windows 94, player progress windows 96, and special event widows 98. Thus, for example, a player may continue to play one or more of a variety of games of chance in individual game windows 88, and/or wager on and watch the outcome of Sports Book events on a special event window 98, while mutually concurrently participating in one or more tournament events in a tournament window 100.

To join in one or more gaming tournaments offered to gaming machine 70, a player may choose to enter the one or more tournaments using player input devices 76 (e.g., keyboard 81), and/or by responding to prompts regarding tournament entry appearing on a tournament window 100 of single display screen 72. A microprocessor of gaming machine 70 may then send appropriate commands to network server 133 linked to gaming device 70 to enter the player in the requested tournament. Preferably, but not necessarily, at least one of player input devices 76 may be dedicated for operation of tournament games during tournament play. Tournament play buttons of player input devices 76 may also be assigned for tournament play by a microprocessor 110 of gaming machine 70. Tournament play buttons assigned to a player may blink on and off, or be otherwise brought to the player's attention through instructions on single display screen 72, and the like. Thus, while remaining on gaming machine 70, a player may opt to participate in one or more gaming tournaments, and may further concurrently play any of a variety of selected games of chance on single screen display 72. In this regard, tournament windows 100 may be configured to be graphically distinct, for example, in size, shape, color, illumination, and the like, from other windows mutually concurrently appearing on single display screen 72.

During tournament play, the player's tournament points are displayed on single display screen 72, preferably within a tournament window or meter (not shown) separate from the tournament window(s) 100 in which the tournament games are played. At the end of a given tournament, the winner or winners are determined whereafter a player's winnings on gaming machine 70 may be posted back to credit meter 84, unless a progressive jackpot is offered, in which case the award may be paid by an attendant.

Figure 4F:
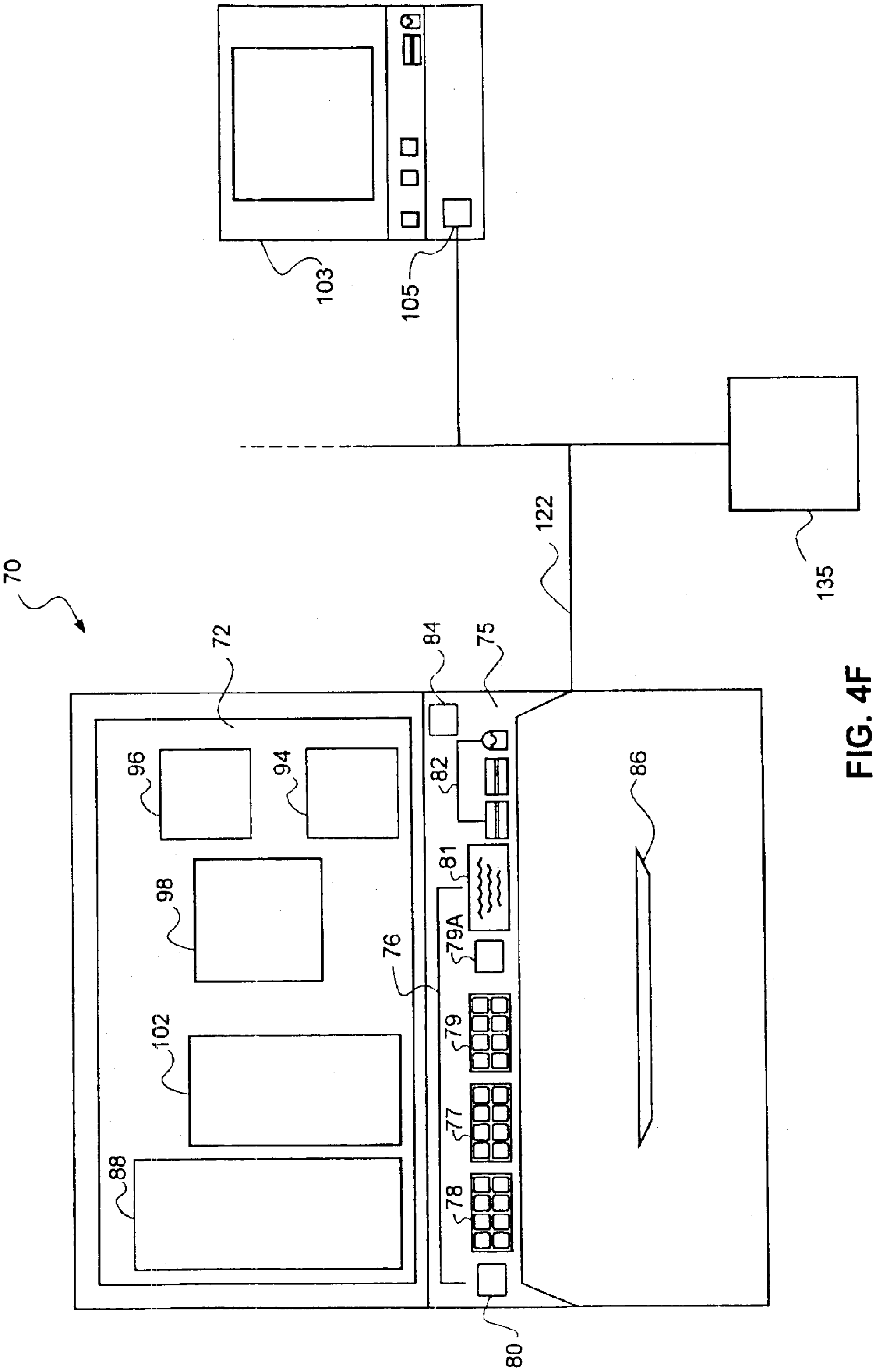

In another exemplary embodiment of the present invention as shown in FIG. 4F, gaming machine 70 includes one or more "companion display" window 102 on single display screen 72. Many casino patrons arrive at the casino with one or more friends, spouses, or significant others, etc. ("companions") with whom they wish to share their gaming experiences. Through a companion display window 102, a player on gaming machine 70 may "link" to one or more other gaming machines on which one or more companions is concurrently engaged in play. Preferably, such linking may take place using browser software (not shown) on gaming machine 70 which links to a responsive interface (e.g., a web server 105) associated with the companion's gaming machine 103 using protocols and communication links 122 well-known in the art. By linking to a companion's gaming machine 103, the player may view the companion's gaming experience on a companion display window 102 of single screen display 72 in real-time as the companion plays. Typically, viewing a companion's gaming experience on companion display window 102 may involve being presented with a game image of the companion's game as that image appears to the companion on the companion's gaming machine 103.

Preferably, an exact, but smaller, image of the companion's concurrently played game may be displayed in companion display window 102. Thus, companion display, window 102 may allow a player on gaming machine 70 to view the companion's game outcomes as well as various play decisions made by the companion that also appear on the companion's display. Play decisions that may be viewed include, for example, the selection of "lucky" numbers for electronic Keno or roulette, decisions to "hold" a particular card during play of electronic card games, particular paylines selected for spins of electronic slot machine games, etc.

A portion of a first companion display window 102 or a separate second companion display window (not shown) may also contain various information relating to the play of the companion's game of chance. The information displayed in this window or window portion may include, for example, the number of credits wagered, number of credits available, cumulative winnings earned, etc. In another aspect of the embodiment, a companion display window 102 or window portion thereof may display various information, such as statistical play information associated with ongoing tournament play engaged in by the player's companion. As a non nonlimiting example in this regard, a microprocessor (not shown) associated with the companion's gaming machine 103 is provided in communication with web server 105, server 105 and feeds the desired gaming information to web server 105 for transmission to companion display window 102 on gaming machine 70. Desired information can be extracted from the companion's gaming machine 103 by, for example, an applet residing in, or downloaded by, the companion's gaming machine 103.

In addition to viewing a companion's game image, a player may preferably be provided with a communication link in the form of email software, and audio and/or video apparatus for communication with a companion on a linked gaming machine. In this embodiment, gaming machine 70 may be configured with telecommunications apparatus known in the art, such as a microphone, video camera, speakers, etc., suitable for such audio and/or visual communication. Of course, the companion's gaming machine 103 operated by the companion may also be reciprocally configured with suitable telecommunications apparatus of a type for interactive communication with gaming machine 70. Thus, in accordance with the subject embodiment, a player on gaming machine 70 may both observe a companion's play and communicate with that player at the same time.

Still referring to FIG. 4F, a player may initiate a "link" between gaming machine 70 and a companion's gaming machine 103 by a variety of means. For example, players may indicate their identity, or the companion's identity, to gaming machine 70, such as through a unique identifier, so gaming machine 70 can facilitate the link. There are many methods of indicating a player's or a companion's unique identifier including, but not limited to, bar codes, magnetic encoded data strips, "smart" cards with embedded microchips, personal identification numbers ("PIN numbers"), and any other form of identity verification including, alphanumeric, magnetic, physical (i.e., thumb print, retinal scan, etc), digital, electronic or optical. Bar codes, magnetic encoded data strips and "smart" cards may be read by card readers associated with wagering input components 82 on gaming machine 70.

PIN entry may be accomplished within a portion of a window provided as a touchscreen or through an external PIN entry device of player input controls 76, such as keyboard 81 or a keypad or cursor manipulating device such as a touchpad, rollerball or mouse.

In a preferred embodiment, the player's identifier and/or the companion's identifier is entered into a graphical user interface displayed on a portion of single display screen 72. The graphical user interface may be displayed, for example, by browser software residing in, or accessible by, gaming machine 70. In this case, the PIN numbers or other personal identifiers are submitted to a web server 124 embedded in gaming machine 70, whereupon the PIN numbers or other personal identifiers are transmitted by web server 124 (FIG. 3) to a linked casino file server 135.

The use and function of readers and external PIN entry devices are well-known in the art. Preferably, in each of the various above-described embodiments, an "entered" unique identifier is transmitted to a linked casino file server 135 configured to "register" players with various gaming machines and to sort and route various requests to connect (link) to a specified companion.

In a further aspect of the embodiment, "Bluetooth" technology electronic communicators may be used to register the player's identity. The Bluetooth technology, such as that offered by Motorola of Phoenix, Ariz., comprises a small, short range, low-power, unlicensed, wireless transmitter or transceiver capable of transmitting data to a corresponding receiver or transceiver within a gaming machine. Using Bluetooth technology, a player need only approach a game and the game may automatically submit the player's unique identity to the gaming machine's microprocessor for communication purposes and other processing, as will be described hereafter.

Once the player's identity has been specified, one embodiment of the present invention allows a player to request gaming machine 70 to "search" for a gaming machine in which a companion has similarly specified his or her identifying information. For example, companion display window 102 may prompt a player to enter a companion's name, a player's password, a mutual password, or the like, using touch screen controls and/or player input devices 76. Preferably, such prompts may occur by way of a graphical user interface displayed by web browser software residing in gaming machine 70. Gaming machine 70 may then use the entered information to send a request for a "link" to casino file server 135 or other processing device associated with the casino. The casino file server 135 may then evaluate the request against other registered users in its database, review any security information associated with the request (e.g., password information or casino or player-initiated blocks on communication attempts), and complete the link. A communication link would then be opened and established between the gaming machines. As previously discussed, the link would result in a companion's game image appearing in companion display window 102, as well as video and/or audio telecommunications capability, and/or other information related to the companion's gaming experience. One skilled in the art will recognize that game image links between players in casinos remote from one another can be established using WANs or the World Wide Web.

In another aspect of the embodiment, a link between "companions" may be accomplished by way of an email messaging system. For example, a player entering a casino may be provided with a unique email address which may be shared with the player's companions. Preferably, a player may opt to have the companions' email addresses preprogrammed into a casino smart card which may trigger gaming machine 70 to automatically initiate the desired links. The player may also manually enter a companion's email address into gaming machine 70 using, for example, a graphical user interface configured to receive player-initiated data from player input devices 76 on gaming machine 70. The game image link may be established, for example, by automatic association of gaming machine 70's network address and the companion's gaming machine network address as derived from the email address specified by the player on gaming machine 70. For example, a file server receiving the email may combine the email information and stored information regarding the companion's whereabouts to route the communication request appropriately, initiate an open communications channel between the gaming machines, and oversee and/or facilitate data transmissions between the two locations (e.g., by specifying the appropriate network protocols for data transmission).

One skilled in the art will recognized that the use of personal identifiers may also be used to facilitate entry into a tournament or special event and to provide payoffs or rewards for the tournament or event at some later time. For example, a player may use a unique identifier to enter a tournament with no further registration required. Since the identifier may be "registered" with a particular gaming machine, for example, for purposes of tournament play, a player may also use the identifier to receive payoffs or rewards for wins on that gaming machine at a time of the player's choosing.

Referring now to FIGS. 2–4(A–F), one or more or all of windows 94, 96, 98, 100, and 102 may be selected by a player for display and operation on single display screen 72 using appropriate player input devices 76 configured for that purpose. Each of windows 94, 96, 98, 100, and 102 may be of fixed location and size, or may be relocated and adjusted in size as previously described in relation to individual gaming windows 88. It is understood, of course, that each of windows 88, 94, 96, 98, 100, and 102 will be capable of operating independently from each of the other windows 88, 94, 96, 98, 100 and 102. Certain interaction between the windows 88, 94, 96, 98, 100, and 102 is contemplated, however. For example, certain game outcomes on one or more individual gaming windows 88 may trigger "bonus games" on other individual game windows 88, as is discussed in more detail later herein.

Game outcomes may also trigger the opportunity to participate in tournaments or in casino special events, such as Sports Book events, scheduled to appear or appearing in special event window 98. Additionally, particular information display in informational window 94 may be provided with an interactive link (e.g., a hyperlink) to, for example, a particular gaming tournament available on tournament window 100, or to a casino-sanctioned gaming event appearing, or soon to appear, on special event window 98.

Figure 5:
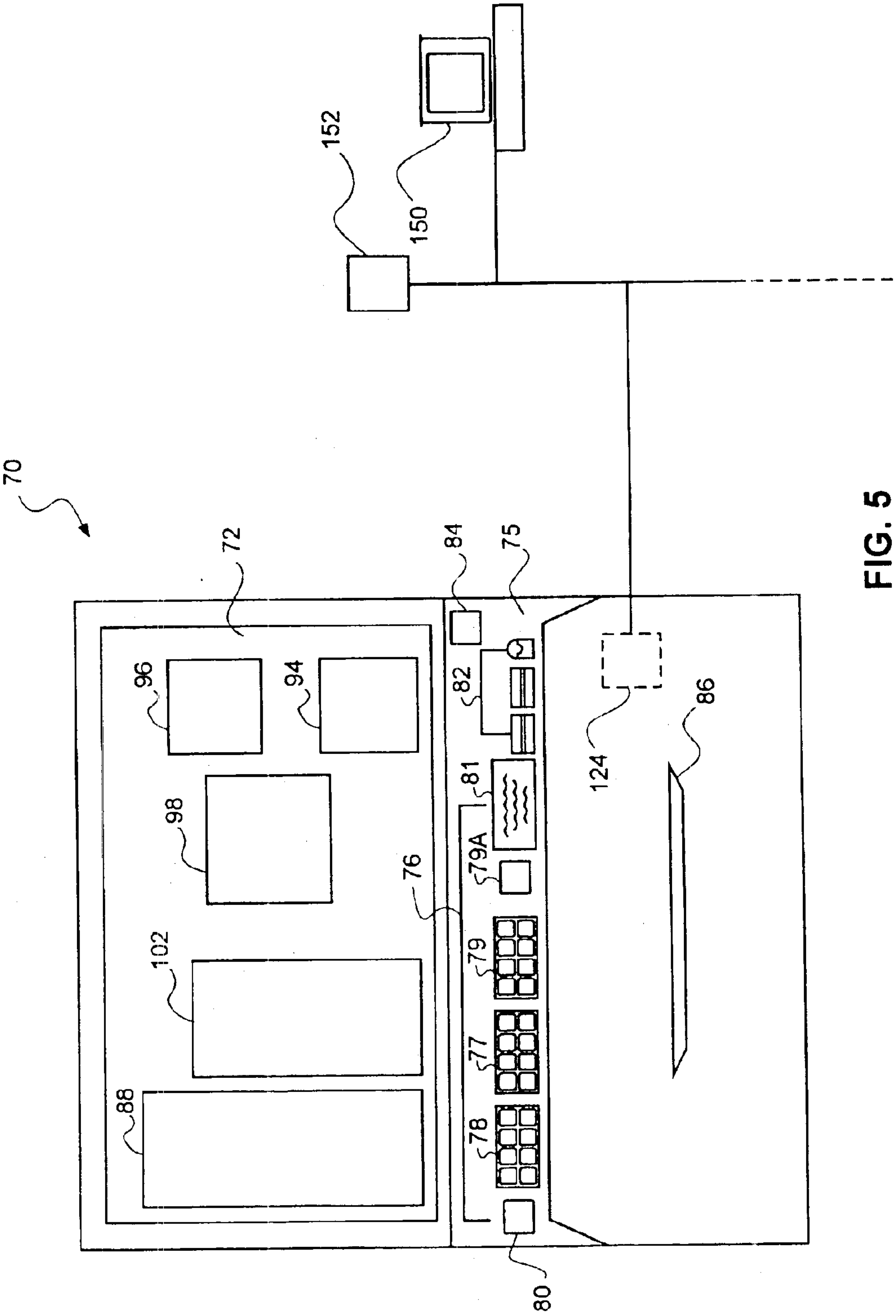
FIG. 5 is a schematic diagram of a gaming machine configuration according to the present invention wherein the gaming machine is linked to a web-based device through a network.

With reference to FIG. 5, the inclusion of an embedded web server 124 (shown in outline form) on a gaming machine 70 of the present invention allows access of a gaming machine by a remotely located individual, as well as various other functionalities. As described herein, the "access" provided by web server 124 may allow remote operation of gaming machine 70, such as in games of chance, or may allow the remote user to simply view the gaming experience of another individual. As used herein, the term "web server" encompasses any type of network server which may be incorporated in gaming machine 70 of the present invention.

To initiate a link with gaming machine 70, a remote user may, for example, activate a web browser (graphical user interface) of a known or specially designed type located on a web-based device 150 (e.g., a workstation such as a personal computer). The remote user may then specify a URL associated with web server 124 on gaming machine 70. In one aspect of the embodiment, the remote user may automatically gain access to the URL of the web server 124 by surfing to a web site operated by the casino and clicking on appropriate hyperlinks to establish a web-based connection with web server 124. Of course, a remote user may be required to preregister with the casino before initiating such remote user services and may have to undergo a log-in or other security routine before the connection is established.

Once the link between web-based device 150 and web server 124 has been established, the web browser of the remote user may, for example, then transmit appropriate commands via HTTP to web server 124, which, in turn, processes the commands and generates a web page providing interactive operating or display options back to web-based device 150. The generated web page is then displayed on a web browser associated with web-based device 150. As previously discussed, web server 124 is linked to digital microprocessor 110 (FIG. 3), allowing for web server 124 to support one or more control operations that relate to the function of gaming machine 70. A casino-based player on a gaming machine 70 may also use player input control devices 76 to authorize or terminate one or more "links."

A web page generated by web server 124 may preferably contain java script, or other executable software, that allows remote operation of gaming machine 70. The generated web page may also preferably provide executable software that allows real-time gaming images appearing on gaming machine 70 to be simultaneously transmitted and displayed to web-based device 150. Preferably, the executable software allowing operation and image transmission may be triggered by the remote user clicking on an appropriate icon displayed by the generated web page.

Preferably, a digital microprocessor 110 of gaming machine 70 (FIG. 3) supports SMTP protocol and is associated with web server 124, making web server 124 accessible via an email client of a remotely located user on web-based device 150. In this embodiment, the email client and web server 124 may comprise compatible software allowing for interactive commands in the email to be recognized and executed by web server 124. In one aspect of the embodiment, an email sent to a designated domain of a casino harboring gaming machines 70 automatically establishes a link between the remote user's web-based device 150 and a web server 124 by routing the web-based device 150 to an available gaming machine 70, or a gaming machine 70 occupied by a companion of the remote user, when, for example, the remote user clicks on an email reply from the casino which contains embedded commands for establishing a connection.

In the embodiment providing for real-time display of game images, a player on gaming machine 70 may manually provide the remote user with the web address (e.g., the URL) of web server 124. For example, the player may use an email feature on gaming machine 70 to transmit the web address of web server 124 or the player may simply place a telephone call with the remote user to reveal the address. The remote user's email address could also be automatically messaged in the situation where the email address has been programmed into the player's smart card or player preferences.

A remote user may also search for a particular player using a web server 152 hosted by the casino, with the casino web server 152 identifying the player through player tracking systems (e.g., unique identifiers) as previously discussed. Once the player has been located, the casino server 152 may facilitate the connection automatically (e.g., by acting as a conduit to web server 124) or may provide the remote user with the URL of web server 124.

Gaming machine 70 may also be configured to allow remote users to participate in play with a player physically present at gaming machine 70. For example, a casino player may "authorize" a remote user linked to gaming machine 70 to play one or more games of chance. Preferably, the remote user's game may be displayed in a companion window 102 on single display screen 72, and is thus viewable by the player in the casino on gaming machine 70. The remote user may concurrently view and control the remote user's game of chance on web-based device 150, for example, through web-based interaction with web server 124. Wagers and wager inputs may be made independently through operation of web-based device 150 by the remote user (e.g., through credit card authorization) or may be made by the player on gaming machine 70, either manually or through an authorization to use existing credits. Various interaction between the games of remote users and players present at gaming machine 70 is contemplated, as will be described in more detail below.

When not in use by a player, single display screen 72 of gaming machine 70 may preferably concurrently display a plurality of game images representative of the wide variety of games of chance that may be played on gaming machine 70. To attract potential players, a plurality of games of chance may be simultaneously displayed in individual game windows 88, and/or the games may "pop-up" in individual game windows 88 of varying sizes and locations in a manner that demonstrates the versatility of gaming machine 70. Informational window 94 and special event window 98 will also preferably be displayed to pique player interest in the capabilities of gaming machine 70 and to foster participation in casino-sponsored or sanctioned events. Demonstrations of the various capabilities of gaming machine 70 are contemplated, with a microprocessor of gaming machine 70 simulating simultaneous play on single display screen 72 of a variety of games, including tournament games, videos of Sports Book and Racing Book events, and/or simultaneous play of differing games of chance.

Referring again to FIGS. 2, 3 and 4(A–F), after one or more games have been selected for play, instructive information regarding the execution of available wagering options is preferably displayed or otherwise conveyed, for example, in an individual gaming window 88 on single display screen 72, and/or by posted information on or around wagering buttons 79. A particular individual gaming window 88 may flash, blink, become intensely illuminated, or grow in size, for example, as a prompt for a player to change or enter a wager. Responsive preprogrammed instructions may also be broadcast either automatically or at the player's option.

In a currently preferred embodiment of the invention, a predetermined "default" amount of the player's available credits is automatically wagered in each selected game of chance. In addition, a player may choose to input a customized default wager for one or more selected games using player input devices 76 such as wagering buttons 79, touch screen locations on single display screen 72, or keyboard 81. A player may also opt to alter the default wager for one or more games of chance by use of wagering buttons 79 on console 75 or by use of touch screen controls on single display screen 72. Changing wagers on individual games can be effected, for example, by individual input components 82 provided for each selected game, by a wagering button 79 for each class and/or type of game (e.g., a wagering button used for wagering in all reel slot machine games), by touch screen controls on single display screen 72, and/or a by a master wagering button 79*a* with one or more functionalities. A master wagering button 79*a* may be used, for example, for wagering a common amount for each game or for "cycling" to each individual game for the purpose of selecting individual wagers.

A credit meter 84 incorporated into console 75 of gaming machine 70 displays credits available for play. Information regarding available credits may also preferably be displayed in one or more areas of single display screen 72. In this regard, games selected for play may have separate or common crediting displays. Since many players enjoy the display of independent, cumulative crediting for individual games, separate crediting may be preferred. In this embodiment of the invention, players may elect to have such crediting for one or more games displayed in an image in or adjacent to individual game windows 88, or on other conspicuous areas of single display screen 72. Alternatively, or in addition to the separate credit displays, a player could elect to view the credits acquired from play of all games as a single cumulative amount, such as an amount displayed on credit meter 84.

Once wagering is complete, a player initiates play of the selected games, for example, using play activation buttons 78 ("play buttons") or touch screen controls on single display screen 72. For certain games, such as keno or roulette, a player may first be prompted to pick "lucky" numbers using touch screen controls over the locations of the desired numbers, or by using other player input devices 76 (e.g., keyboard 81, a mouse, etc.) which may be configured to allow for selection of particular elements of a game. One of skill in the art will recognize that play buttons 78 may be adapted to have various functionalities and configurations allowing for random, sequential and/or simultaneous play of selected multiple games.

In one embodiment of the invention, each individual game window 88 is assigned its own individual play activation button 78 (or touch screen control). By pressing the individual play activation button 78 (or touch screen control) assigned to a particular individual game window 88, each mutually concurrently displayed game may be started individually. For example, a player selecting four individual gaming windows 88 is provided with four play buttons 78 for each of those individual gaming windows 88. A player may be made aware of a designation of a play button 78 for a particular individual gaming window 88 by means known in the art, including instructive labeling and messaging within individual gaming window 88. To start play in any individual gaming window 88, the appropriate play button 78 may thus be activated. Individual play buttons 78 may preferably be activated in any order, and any single game preferably may be activated any number of times by a play button 78 before activating any other selected game. Therefore, play in this embodiment is much like play on separate conventional gaming machines.

In another embodiment of the invention, the game activation functions of play buttons 78 may be included in a single, and preferably multifunctional, player input element such as "master start button" 80, such term including associated responsive circuitry of the gaming device. Master start button 80 is preferably configured for various modes of starting play of the selected games, which games, as previously described, may be of varying classes and types. In one aspect of the embodiment, activation of master start button 80 starts all selected games simultaneously. In a related aspect, games started simultaneously by master start button 80 may have their playing times determined and coordinated by digital microprocessor 110 (FIG. 3) such that each game outcome is displayed in an ordered (e.g. clockwise, left to right, etc.) or random sequence within predetermined intervals of one another. Alternatively, games started simultaneously by master start button 80 may be timed and coordinated by digital microprocessor 110 such that each game outcome is displayed simultaneously.

Master start button 80 may also be configured to start each of the selected games sequentially in an ordered or random fashion. In this embodiment, the games may be synchronized such that the game outcomes are displayed sequentially or simultaneously, as previously discussed. Games started sequentially by master start button 80 may also be finished randomly or in a specific order.

In a still further aspect of the embodiment, a master start button 80 may be configured to provide a player the option of simultaneous play of tournament games in tournament windows 100 and of other games of chance in individual gaming windows 88. Thus, for players entered into a tournament who desire to play games of chance at the same time as the tournament games, master start button 80 may provide the player the opportunity to push a single button to start both categories of games.

Preferably, a player will be provided with player input devices 76 (e.g., keyboard 81, touchscreen locations on single display screen 72, play buttons 78, a mouse, etc.) allowing the player to select the various options for starting and finishing assorted modes of play.

In a further related embodiment, games activated by play buttons 78 or a master start button 80 may have "play times" determinable by the player wherein one or more game outcomes are displayed "prematurely," or in a delayed manner, on single display screen 72. For example, a player may be provided with one or more player input control devices 76 among play buttons 78 with which to selectively stop "play" of one or more particular games such that the one or more game outcomes are immediately displayed. This embodiment is particularly suitable for providing a player with a "feeling of control" over the spinning reels of reel slot machine games, but may also be applied to any of the various games available in gaming machine 70. In the event a player does not "stop play" within a predetermined period of time, a timer (not shown) associated with digital microprocessor 110 will automatically trigger digital microprocessor 110 to display the game outcome(s).

With reference to FIG. 3, during "play" of the selected games, digital microprocessor 110 of gaming machine 70 randomly generates numbers representing the gaming indicia appropriate for each selected game of chance. Digital microprocessor 110 then displays the game outcome indicia on single screen display 72 and determines winning game outcomes for each of the games by matching the generated numbers to those found in paytables in ROM 112 or in storage medium 118. As in conventional gaming machines, a player with one or more winning game outcomes on gaming machine 70 may receive a payout for each win in the form of additional game credits, currency, and/or other designated prizes.

With reference to FIG. 2, individual gaming windows 88 which have winning outcomes may have those particular outcomes revealed to a player through various means, including those winning windows enlarging, expanding and contracting in size, and/or being subjected to distinctive illumination schemes, such as an increase in intensity for winning out coming windows 88, or a flashing surrounding border. Various distinctive audio sounds may also typically accompany one or more winning outcomes.

One of skill in the art will recognize that the multiple gaming capabilities of the gaming machine of the present invention allow for new and interesting variations of traditional games of chance. In one embodiment of a method of play according to the present invention, a particular outcome or level of winning on one or more games selected for simultaneous, sequential, or random play triggers a microprocessor in gaming machine 70 to activate one or more "bonus" games, in which a player is permitted the opportunity to attempt to achieve winning game outcomes at no additional cost to the player (i.e., without the input of additional currency or the wagering of available credits). Referring again to FIG. 2, the bonus games are played in one or more individual gaming windows 88 on single display screen 72 and may be displayed and played mutually concurrently with other games of chance. Typically, each winning bonus game outcome has an associated pay value represented by an amount of coins, credits or other designated prizes awarded to the player.

The bonus games may be of the same, similar or completely different class or type as the games in which the winning outcome(s) were achieved. For example, a reel slot machine game on gaming machine 70 may have an outcome characterized by the display of three of the same symbols on adjacent reels, causing a microprocessor within the gaming machine to automatically enter the player in one or more bonus games of video poker (or some other game(s) of chance).

A win on one bonus game may also automatically trigger one or more second bonus games of the same or varying type or class of games of chance. In a further aspect of the embodiment, a player achieving a certain game outcome or level of winning is provided with a plurality of bonus games comprising differing classes of games of chance. For example, a specific game outcome in one or more games may trigger one bonus game of each of an electronic reel slot machine, an electronic video poker game, an electronic blackjack game, an electronic keno game, etc.

Further, games according to the invention may be set at varying levels on a ladder, so the term "bonus" games is not to be interpreted as restrictive but rather enabling. Specifically, an additional wager may or may not be required to play games at one level enabled by winning (or play rates, or accumulated wins, etc.) at one or more games in a preceding level. The higher level games may provide a more lucrative paytable, for example, or an opportunity to win greater awards.

The number of bonus games may also be multiplied by a predetermined multiplier, for example, in the case where there are simultaneous winning outcomes resulting from play of the same and/or differing games of chance. In this aspect of the embodiment, the multiplier provided to the player may be the same as the number of games simultaneously won. For example, two simultaneous wins may result in a multiplier of "×2" while three simultaneous wins may result in a multiplier of "×3," etc.

The multipliers may also be applied to wagers in primary games of chance in individual gaming windows 88 of single display screen 72, and/or the multipliers may be applied to potential winnings in one or more bonus games. In one aspect of the embodiment, a video image of a plurality of potential multipliers may be displayed on the periphery of a stimulated rotatable wheel in a individual an individual gaming window 88 on single display screen 72. The wheel could start spinning automatically or upon player activation by use of touch screen controls or player input devices 76. A simulated indicator may indicate the area of the rotatable wheel corresponding to the multiplier which will be supplied to the player.

In a further embodiment of the invention, large awards or jackpots may be based on the achievement of simultaneous wins on multiple games of the same or varying types of classes. For example, any two simultaneous wins having particular game outcomes may provide a multiplied or otherwise enhanced jackpot of a predetermined amount which is higher than the amount paid for two independently achieved jackpots for the same outcomes. Simultaneous wins of any three games may pay a higher amount than that of any two simultaneous wins, and so on, with progressively higher jackpots resulting from higher numbers of simultaneous wins. Simultaneous wins on two or more differing games of chance (e.g., simultaneous wins on a reel machine game and a video poker game) may also pay a jackpot which varies (e.g., is increased) from an amount paid for a simultaneous win on two or more of the same games of chance (e.g., two simultaneous wins on reel slot machine games).

In an additional aspect of the embodiment, a gaming machine 70 is configured with a payout scheme that uses an internal progressive based on simultaneous, sequential or random play of multiple games displayed on single screen display 72.

In another aspect of the embodiment, simultaneous wins on multiple games may automatically qualify a player for entry into a gaming tournament sponsored or sanctioned by the casino. In this embodiment (see FIG. 4E), a tournament window 100 may be displayed on single display screen 72 in addition to one or more individual gaming windows 88. The player may then opt to enter into the tournament using player input devices 76, and begin play on tournament window 100 at any time during which the tournament is being conducted. As previously described, a player may continue play on one or more individual gaming windows 88 while playing in the tournament.

In a currently preferred embodiment of the present invention (see FIG. 2), a player achieving winning outcomes on a predetermined number of differing games within a predetermined time period is provided with a multiplied jackpot or high award not otherwise offered by gaming machine 70. For example, relatively large jackpots or awards could be provided to a player with one or more wins on each of the various games of chance offered on gaming machine 70. Preferably, the relatively large jackpots or awards would be paid in the situation where the wins occur within a predetermined span of hours or even days (using appropriate player identification technologies as discussed previously).

In another embodiment of the invention, a player's available options for playing a variety of games may be increased upon the player's achieving one or more specific game outcomes in one or more "primary" games of chance. For example, gaming machine 70 may be configured to initially provide a player only a limited choice in types of games available for play (e.g., two primary games are initially provided consisting of a reel slot machine game and a keno game). Upon achieving a specified game outcome in one or more of the primary games, the player may consequently be offered one or more new types of games of chance in which to play in addition to, or instead of, the primary games. Specified game outcomes in this expanded mode of play may result in the addition of still further new games of chance becoming available to the player and so on.

The above concept may also be applied in terms of the number of games offered to a player. For example, a player may initially be provided with the opportunity to wager on only two games of chance of the same or a varying type. Upon achieving a specific outcome in one or more of the available games, the player could be rewarded, in part, by notification to the player of the opportunity to play and wager in an increased number of games, also of the same or a varying type.

At some predetermined high level of wagering, which may consider the number of games played per time period and/or number of dollars wagered per time period, a player may also be provided with one or more "complimentary games" in one or more individual gaming windows 88 which provide a player a chance to win at no additional cost for a predetermined period of time, or for a predetermined number of spins. In this embodiment, the player must continue to wager on and play at least one other game of chance in order to take advantage of the complimentary games. Thus, a complimentary game is displayed simultaneously with the at least one other game of chance on single display screen 72.

The complimentary game may be caused to play automatically in response to a player's initiation of play in one or more other games of chance in which wagers have been placed. Preferably, the game outcome(s) of the complimentary game(s) are revealed substantially simultaneously with the game outcome(s) of the at least one other game of chance in which the player has wagered. Also preferably, a specific winning outcome on a complimentary game may be augmented by an increase in the player's wager in the at least one other game of chance. In one aspect of the embodiment, the highest (or lowest) wager amount placed on the same type of game as the complimentary game will be attributed to that complimentary game. For example, an eligible player wagering a dollar on a reel slot machine game may also have that wager amount (a dollar) applied to play of the complimentary game. Thus, in the example provided, any winning outcomes on the complimentary game would pay as if a dollar had been wagered by a player. In an additional aspect of the embodiment, a player may be provided with the opportunity to increase the wager on a complimentary game beyond that of the player's wager on the at least one other game of chance.

One skilled in the art will recognize that the complimentary game of the present invention differs from conventional bonus games in that the complimentary game is displayed and played mutually concurrently with games in which wagers are made. Furthermore, the wagered amounts on a complimentary game may be tied to wagers made by the player on other concurrently displayed games of chance.

Again referring to FIG. 2, a wide variety of other interaction is contemplated between multiple games displayed on individual gaming windows 88. In a preferred embodiment of the invention, a player is allowed to play a plurality of games (preferably different games) until one game achieves a specific outcome. The game with the specific outcome may then be then "locked up" (i.e., is frozen and unavailable for play) and the player is given a predetermined number of plays (for example, ten) or predetermined time period (for example, two minutes) in which to achieve a specific outcome in at least one of the remaining games. If the player achieves the specific outcome on at least one of the remaining games, then that game may also be locked up and the player again given a predetermined number of plays or a predetermined time period in which to achieve a specific outcome in at least an additional one of the remaining games and so on. A player able to achieve required specific outcomes in all of the initially displayed games in individual gaming windows 88 may be provided with a "grand prize" or other appropriate award. It is also contemplated that another approach to multiple game interaction may involve logging in memory of the gaming machine each specific outcome of a game which may interact with a specific outcome of another game and then releasing the game in which the specific outcome is achieved for further play of that game enabled by an additional wager. Thus, a portion or portions of the gaming capability of gaming machine 70 will not be removed from service when specific outcomes are achieved. When play of all of the potentially interactive games has concluded, the gaming machine will award a bonus related to the number of specific, interactive outcomes achieved during play of the various games.

As an illustrative example, a player may be initially provided with a reel slot machine game, a video poker game, an electronic blackjack game, and a keno game in four mutually concurrently displayed individual gaming windows 88. Upon a player achieving, for example, three of a kind on the reel slot machine game, that game will lock up, leaving the player with the three remaining games. The player may then be given, for example, 10 spins or plays in which to achieve some specific outcome in the remaining games of video poker, blackjack, and keno. If, for example, the player receives a "21" in blackjack within the 10 spins, that game will lock up, leaving two mutually concurrently displayed games for play. A specific outcome, for example, of a full house or a higher ranking outcome in video poker (e.g., four of a kind) within 10 more spins will lock that game, thus leaving the player with a final opportunity to "win" on the remaining game of keno.

Many variations of this type of game are possible and are contemplated within the scope of the invention. For example, the number of spins or plays could be varied by providing the player with more or less spins or plays in which to achieve the specific outcomes leading to the next "level" of the game. The same time period, or various graduated time periods, could be offered in lieu of a number of spins or plays in which to achieve the specific outcomes. Various payoffs are preferably provided after each specific outcome is achieved, the payoffs increasing in value with each successive specific outcome. In addition, some or all of the games could be the same game, or all of the games could be different.

In a still further embodiment, gaming machine 70 may be configured with a gaming mode in which a player starts with an initial type or class of a game of chance, and with a specific game outcome or level of winning "earns" the right to play one or more differing types or classes of games of chance. For example, a player selecting the subject gaming mode may be initially provided with one or more instances of reel slot machine games on single display screen 72, with the number of games preferably depending upon the number of credits the player desires to wager per play. Upon the player receiving one or more specified game outcomes, or attaining a predetermined level of winning or a specified rate of play, gaming machine 70 automatically changes the displayed game(s) of chance (reel slot machine games) to that of a differing type or class of a game of chance, for example, a video blackjack game. In this manner, a player at gaming machine 70 could attempt to go "around the world" by sequentially going through each game type or class available on gaming machine 70. Preferably, prizes and/or awards of increasing value are provided when the player successfully advances through each level (e.g., the player successfully achieves specified game outcomes in each game type or class).

In a related aspect of the embodiment, a gaming mode of gaming machine 70 may be configured in a similar manner to permit a player the chance to go "around the world" in various types of games offered in a specific game class. For example, the player may be initially provided with one or more three reel slot machine games, each game having three paylines. As the player achieves certain game outcomes, levels of winning, and/or specified play parameters are satisfied, the player would be provided with added paylines, added numbers of reels, and the like. Similarly, a player may select a gaming mode in which various types of poker are played in a sequential manner. For example, a player may start with one or more games of 5-card draw and then move on in a sequential manner to 7-card draw, Pai-Gow, etc. after a specified game outcome, winning level, and/or play parameter is satisfied.

In order to facilitate play in this manner and to preserve a player's winning position to continue a "trip" around the world, a host or smart card may be employed to save the current state of game play (the current state of achievement in terms of game outcomes, levels of winning and/or specific play parameters satisfied) so that play on the trip may be resumed later on the same gaming machine or another of the same type. Preferably, the saved current state of game play would include a time stamp so that play would have to be resumed within a reasonable period of time (such as, for example, three hours, twelve hours or twenty four hours) to continue the trip.

In a still further embodiment, a player may be initially provided with only a single instance of a first player-selected or gaming machine-selected game of chance. Upon the player achieving certain game outcomes, levels of winning, and/or satisfying specified play parameters, the player may be provided the option of playing a second game of chance, which may include one or more additional instances of the same or a differing game of chance at the same time as the first game of chance. Attaining further specified outcomes, winnings, or play parameters would result in still further instances of the same or differing games of chances for play at the same time as the first and second games of chance, chance and so on. In this manner, a player is challenged to end up playing as many simultaneous games of chances as gaming machine 70 is configured to allow. Of course, with each additional game of chance added to single display screen 72 of gaming device 70, the odds of winning for the player go up, thus making continuous play in this manner more attractive to the player. Additionally, multipliers may optionally be activated as the player achieves various levels of numbers of games to further increase the player's willingness to engage in continuous play.

Referring again to FIG. 4E, FIG. 4F and FIG. 5, gaming machine 70 is particularly adapted to games involving cooperative play between players at gaming machines remote from one another. For example, one or more players on gaming machines 70 may enter a gaming tournament as a team, with the combined outcomes of the players assessed in determining the winners of the tournament. Tournament windows 100 may be used for tournament play, and a player progress window 96 may be used to display information related to the player's statistics in the tournament.

Using mutually concurrently displayed companion display windows 102 on gaming machines 70, the players may observe each other's tournament game outcomes in real time, real-time and thus more fully share in the ongoing excitement of team play. A separate companion display window 102 may be used to display playing statistics for each teammate or combined statistics for the team. One or more windows in gaming machine 70 may also be provided for the display of statistics of competitors within the tournament.

Using the audio and video components of their respective gaming machines 70, remotely located players may also communicate with one another to coordinate entry into a tournament, to discuss play during the tournament, and the like. Since each gaming machine 70 is configured with individual gaming windows 88 which operate independently from tournament windows 100 and companion display windows 102, a player on gaming machine 70 may choose to play other games of chance at the same time as the tournament games.

Using companion display windows 102, new types of games in which remotely located players cooperate in play are contemplated. In this embodiment, players may link their gaming machines together in a manner previously described and opt to have various games of chance commonly mutually concurrently displayed for play in individual gaming windows 88 of separate gaming machines 70. For ease of discussion, gaming machines 70 linked together in such fashion are referred to herein as "cooperatively linked" gaming machines 70. For example, players at different gaming machines 70 may mutually participate in gaming decisions during one or more jointly played games of chance. Players participating in this embodiment may, for example, use wagering input components 82 and wagering buttons 79 to place wagers on any of the mutually concurrently displayed games. Player input devices 76 on any of the participating gaming machines 70 may operate all, or only a selected or randomly assigned number, of the displayed games of chance on each of the cooperatively linked gaming machines 70. Preferably, the outcomes on each of the jointly played games are mutually displayed simultaneously on each of the cooperatively linked gaming machines 70.

Players may also be assigned particular games on another player's cooperatively linked gaming machine 70 for which the player is accountable and/or primarily responsible for play. For example, games selected for mutual play could be assigned to each of four players (e.g., with three of the players being remotely located on linked gaming machines 70) by dividing the single display screens 72 into quadrants containing roughly equal numbers of games, with each player responsible for a particular quadrant. Alternatively, one player could be responsible for one type or class of game (e.g., one player could be responsible for video poker while another is responsible for keno, etc.).

Credits or other awards won during the jointly played games could be apportioned, for example, with all winnings to the player who achieved the winning outcome and with no winnings posted to the joint players. More preferably, a specific higher percentage is posted to the player who produced the winning outcome with lesser percentages posted to the other joint players (e.g., a winning player in a threesome engaged in joint play may receive 50% of the winnings while the other two players receive 25% each). Alternatively, winning credits could be distributed evenly or in some other fashion determined by the players. A microprocessor of a server or other computing device linking each of the games may calculate the apportionments and send signals to the linked gaming machines directing the payment of the appropriate amount of credits.

As previously described, various forms of interaction may also take place between the mutually played games on cooperatively linked gaming machines 70. For example, the players may jointly participate in multiplayer variations of the games previously described herein. Thus, specific outcomes achieved by one or more of the jointly playing players may result in bonus games or complimentary games for one, some, or all of the jointly playing players. Various jackpots may be awarded for simultaneous winning outcomes of the same or of differing games of chance, with the largest awards paid for simultaneous winning outcomes achieved by each of the jointly participating players.

Multiple players on cooperatively linked gaming machines 70 may also jointly participate in the previously described game in which specific outcomes or winning levels are attempted in each of a plurality of games within a certain number of plays (or within a certain time period). In a preferred embodiment of the jointly played game, players acting as a team may each be commonly assigned a plurality of types and/or classes of games of chance for play.

For example, each of the players on separate but cooperatively linked gaming machines 70 may be assigned the same blackjack game, video poker game, reel slot machine game, and keno game on their respective gaming machines. Each player would then play their own set of these games (e.g., in any desired order or simultaneously) until one of the players in the group achieves a specific outcome in at least type of game (e.g., blackjack). The game class or type with the specific outcome then "locks up" for each of the players, and the players are then given a predetermined number of plays or a predetermined time period in which to achieve a specific outcome in at least one of the remaining games. The achievement of a specific outcome by any jointly playing player in any of the remaining three games will cause that game to lock up for all the players, and the players are again given a predetermined number of plays or predetermined time period in which to achieve a specific outcome in at least one of the remaining games, and so on. If the players are able to jointly achieve required specific outcomes in all of the initially displayed games, the players may jointly share in a "grand prize" or other appropriate award.

Figure 6:
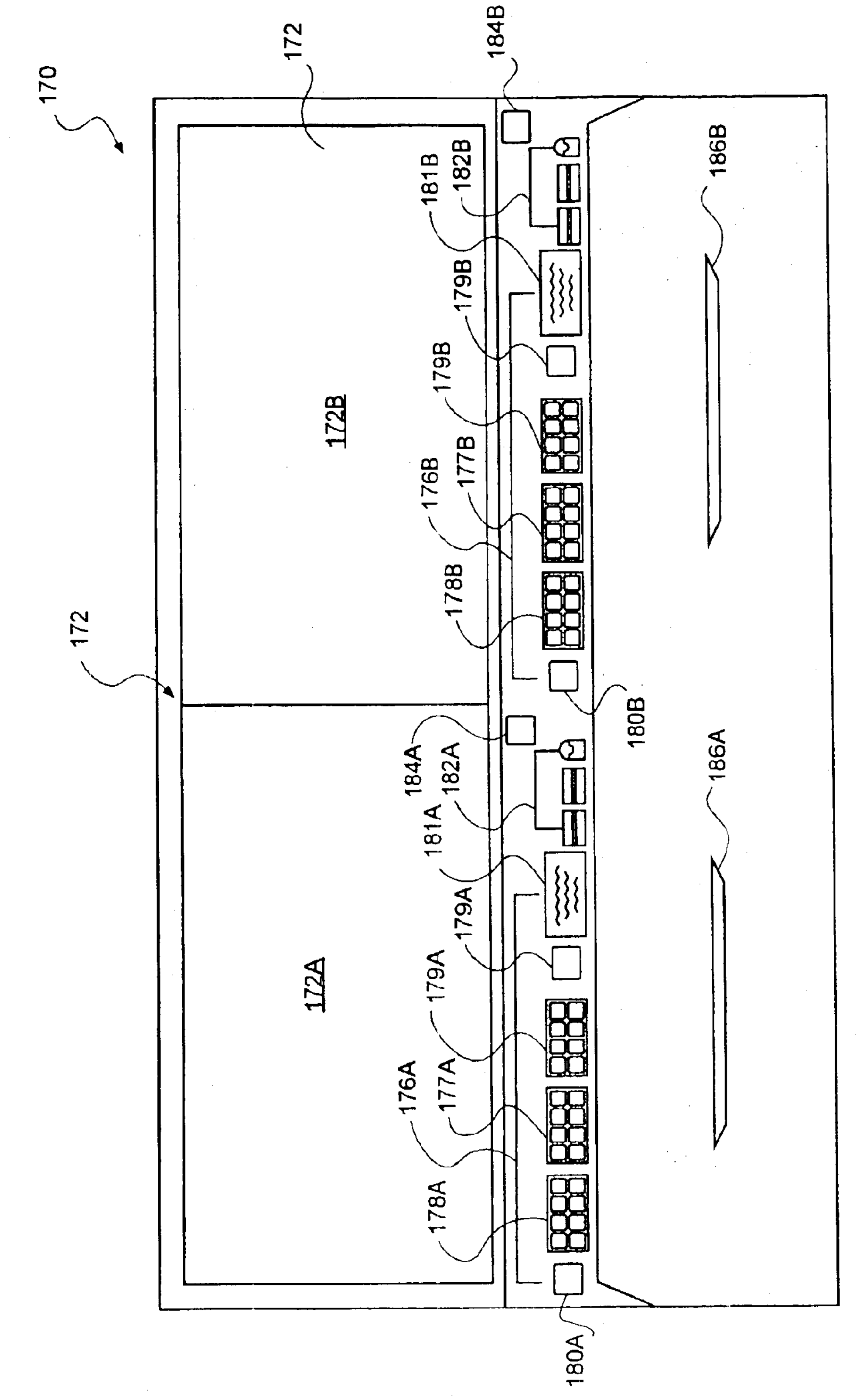
FIG. 6 is a schematic diagram of a multiplayer gaming machine configuration according to the present invention.

With further regard to joint play, one skilled in the art will recognize that the gaming machines of the present invention may be adapted for simultaneous play by more than one player physically present at the machine. As shown in FIG. 6, a gaming machine 170 may be configured with a single display screen 172 as previously described, except that two or more sets of player input controls 176*a* and 176*b* are provided. While two sets of player input controls 176*a* and 176*b* are shown in FIG. 6, the provision of more than two sets of player controls are within the scope of the present invention.

Player input controls 176*a* and 176*b* allow two players to control and access games of chance, gaming information, gaming events, and other gaming functions available on gaming machine 170. The operation and functionality of player input controls 176*a* and 176*b* may be configured in a variety of ways. For example, there may be a hierarchy of control among the player input controls 176*a* and 176*b*, or the controls may have equal priority and access to gaming machine 170.

Preferably, player input controls 176*a* and 176*b* will provide primary control over games and other types of "windows" to be operated on predetermined respective areas of single display 172. For example, single display screen 172 may be graphically divided into two halves 172*a* and 172*b*, with player input controls 176*a* and 176*b* responsible for the operation and conduct of games or other windows as selected for display within the respective halves 172*a* and 172*b*. Separate wagering input components 182*a* and 182*b*, credit meters 184*a* and 184*b*, coin trays 186*a* and 186*b*, game selection buttons 177*a* and 177*b*, play buttons 178*a* and 178*b*, wagering buttons 179*a* and 179*b*, master start buttons 180*a* and 180*b*, and keyboard 181*a* and 181*b*, etc. are contemplated in this embodiment.

Still referring to FIG. 6, the games of chance selected for simultaneous play by each player in a multiplayer configuration of gaming machine 170 may be of any of the variety of games previously described for play herein. The games of chance played by one player on gaming machine 170 may be played completely independently from games played by other players on gaming machine 170, or the games may be configured to be interactive with one another.

In this regard, interactive methods of play as previously described are contemplated for use in this embodiment of the invention. In a gaming machine 170 configured for two players, for example, one or more selected outcomes by both or either of the players may lead to bonus games for the other nonwinning player or for both of the players. Further in this regard, the games played by both players may be configured to be played simultaneously or sequentially, with simultaneous or sequential winning outcomes by either or both of the players triggering bonus games and/or randomly selected multipliers to be applied to the winning outcomes of one or both players.

In one preferred embodiment of a method of playing a game of chance according to the present invention, gaming machine 170 is configured as previously described for simultaneous play by two or more players who compete against each other on the same single display screen 172 (e.g., compete in a "minitournament" against one another). As one example, gaming machine 170 may be activated for play of a "winner-take-all" mini-tournament, wherein the players will simultaneously play one or more of a variety of games for a predetermined time period, at the end of which the winner will be the player with the most tournament credits earned. The players may enter the tournament, for example, after the input of a suitable entry fee. Upon completion of the tournament time period, some or all of the loser's credits won in the game and/or tournament entry fee may be automatically transferred to the winning player.

The games of chance played by each player in the above-described mini minitournament may be the same games of chance or different games of chance. For example, gaming machine 170 may be configured such that one player may choose one type or class of game of chance, e.g., a reel slot machine game of chance, while a second player may choose a different type or class of a game of chance, e.g., video poker. The players may then simultaneously compete against one another, for example, with the player having the most overall wins in their respective game being selected as the "winner," with a transfer of some or all of the other players credits or tournament entry fee. This embodiment of the invention adds to player excitement by fostering competition between players in very close proximity to one another, and by allowing competition between differing "favorite games" of the respective players.

Still referring to FIG. 6, players at a multiplayer configuration of gaming machine 170 may opt to share in the wins and losses of all games played on the single display screen 172. For example, all wins on gaming machine 170 may inure to the mutual benefit of each of the players, with winning credits being evenly distributed to the credit meters 184*a* and 184*b* and/or coin trays 186*a* and 186*b* of each player. In this embodiment, the input of amounts of casino-recognized currency into gaming machine 170 may similarly inure to the benefit of each of the play ers, and thus be subject to wagering by any player playing gaming machine 170. Players at gaming machine 170 may simultaneously play multiple games of varying mutually concurrently displayed games of chance on single display screen 172, as has been previously described.

Similarly, the players at a multi mutiplayer configuration of gaming machine 170 may "team together" in regular tournament play to simultaneously play side-by-side and/or share in any tournament wins that might result. In this embodiment, the players may enter the tournament separately as individuals or place multiple entries in a tournament as a "single entity" if the tournament permits such multiple entries. In the aspect of the embodiment where the players play side-by-side and share in any tournament wins, gaming machine 170 may be configured to distribute tournament winnings equally to the participating side-by-side players or to apportion more of the winnings, e.g., to the player with more tournament wins. A similar payout scheme may result in an aspect of the present embodiment wherein the players place multiple entries in a tournament as a "single entity."

It is specifically contemplated that play of the various games offered on a gaming machine according to the present invention may be enabled by wagering the same or different amounts. In other words, one game may be responsive to a fifty cent wager, while another may require a dollar per play. Since wagering in various denominations is facilitated by state of the art bill acceptors and credit, debit and smart card readers, the gaming machine may easily be programmed to permit a player to select a uniform denomination to be wagered on all of the games to be played, or different denominations for different games.

The various embodiments of the present invention are designed to provide added excitement in gaming machine play in order to increase the enjoyment of players and to serve as an additional attraction to potential casino patrons. Advantages of the present invention from a casino patron's perspective include: use of the latest screen and microprocessor technologies for large screen, high resolution and simultaneous display of a number of differing games on a single display screen; the ergonomic appeal and convenience of having a multiple number of games, which may be the same or different games, mutually concurrently displayed and mutually concurrently playable on a single screen of a single gaming machine; increased opportunities for wagering and winning on a variety of games; new types of games and wagering strategies offered by way of interaction of various game types which may be played simultaneously on a single screen; new tournament and team play possibilities; new features for sharing in a gaming experience with a remotely situated companion; and larger jackpots are made practical through the higher odds made possible by simultaneous or sequential outcomes of two or more games mutually concurrently playable on the single display screen.

Advantages from a casino owner's perspective include: better space and resource allocation utilization since players wanting to play multiple games can now do so on a single gaming machine; increased wagers from players since wagers may be made on simultaneously played games at a single gaming machine; and an increased potential to attract players through new playing possibilities and new types of games.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims. For example, the present apparatus and methods of the present invention may be further applied to a variety of electronically simulated games, such as video arcade games or other games of skill or partially involving skill of a participant and, as used herein, the term "game of chance" includes those games which require or invite some element of player skill. One of skill in the art will also recognize that many of the embodiments disclosed herein are subject to implementation with electromechanical, rather than electronically implemented with video display, games of chance.

What is claimed is:

1. A gaming method, comprising:

receiving a wager;

displaying a plurality of game displays on a single display screen of a gaming device at the same time, the plurality of game displays corresponding to a plurality of games;

providing a first round of play of the plurality of games;

if one game of one of the plurality of games achieves a first outcome during the first round of play, freezing play of the one game;

after freezing play of the one game, providing a second round of play of unfrozen games of the plurality of games;

if an other game of the plurality of games achieves a second outcome during the second round of play, freezing play of the other game; and providing awards based on outcomes of the plurality of games.

2. A gaming method as defined in claim 1, wherein providing the second round of play comprises providing at least one of a number of plays and a time period in which to achieve the second outcome.

3. A gaming method as defined in claim 2, further comprising ending play of the plurality of games if the second outcome is not achieved in the at least one of the number of plays and the time period.

4. A gaming method as defined in claim 1, further comprising:

after freezing play of the other game, providing one or more additional rounds of play of the unfrozen games of the plurality of games; and freezing play of games in which particular outcomes are achieved during the one or more rounds of play.

5. A gaming method as defined in claim 4, wherein providing awards comprises:

providing a first award if the first outcome is achieved during the first round;

providing a second award if the second outcome is achieved during the second round; and providing one or more additional awards if particular outcomes are achieved during the one or more additional rounds.

6. A gaming method as defined in claim 5, wherein the second award is a greater value that the first award and wherein the third award is a greater value than the second award.

7. A gaming method as defined in claim 1, wherein displaying the plurality of game displays comprises displaying a remote game played at a remote gaming device separate from the gaming device.

8. A gaming method as defined in claim 7, wherein providing awards based on outcomes of the plurality of games comprises providing a first award only if the first outcome is achieved by play at the gaming device.

9. A gaming method as defined in claim 1, wherein the plurality of games are selected from a plurality of classes of games including blackjack, poker, reel slot machine, keno, bingo, roulette, and craps.

10. A gaming method as defined in claim 9, wherein each game of the plurality of games is of a different class than the other games of the plurality of games.

11. A gaming method as defined in claim 1, wherein displaying the plurality of game displays on the single display screen comprises displaying each game display of the plurality of game displays in a separate graphical window on the single display screen.

12. A gaming method as defined in claim 1, wherein displaying the plurality of game displays on the single display screen comprises displaying each game display of the plurality of game displays on a separate, separately controllable sub-array of the single display screen.

13. A gaming method, comprising:

receiving a wager;

displaying a first plurality of game displays on a single display screen of a gaming device at the same time, the first plurality of game displays corresponding to a first plurality of games;

determining first outcomes of the first plurality of games;

providing awards based on the first outcomes;

if a first condition is satisfied, displaying a second plurality of game displays on the single display screen at the same time, the second plurality of game displays corresponding to a second plurality of games;

determining second outcomes of the second plurality of games if the first condition is satisfied; and providing awards based on the second outcomes, if any.

14. A gaming method as defined in claim 13, further comprising:

displaying a third plurality of game displays on the single display screen at the same time if a third condition is satisfied, the third plurality of game displays corresponding to a third plurality of games; and determining third outcomes of the third plurality of games if the third condition is satisfied;

providing third awards based on outcomes of the third plurality of games, if any.

15. A gaming method as defined in claim 13, wherein the first plurality of games includes games of a first type, wherein the second plurality of games includes games of a second type, and wherein the first type is different than the second type.

16. A gaming method as defined in claim 15, wherein the first type comprises 5-card draw poker, and wherein the second type comprises 7-card draw poker.

17. A gaming method as defined in claim 13, wherein the first plurality of games includes games of a first class, wherein the second plurality of games includes games of a second class, and wherein the first class is different than the second class.

18. A gaming method as defined in claim 17, wherein the first class comprises reel slot machine games, and wherein the second class comprises blackjack games.

19. A gaming method as defined in claim 13, wherein the first condition comprises achieving at least one specific game outcome associated with the first plurality of games.

20. A gaming method as defined in claim 13, wherein the first condition comprises a level of winning associated with the first plurality of games.

21. A gaming method, comprising:

receiving a wager;

displaying a first game display of a first game on a single display screen of a gaming device;

determining a first outcome of the first game;

if a first condition is satisfied, displaying the first game display and a plurality of second game displays on the single display screen at the same time, the plurality of second game displays corresponding to a plurality of second games;

determining a second outcome of the first game;

determining first outcomes of the plurality of second games;

if a second condition is satisfied, displaying the first game display, the plurality of second game displays, and a plurality of third game displays on the single display screen at the same time, the plurality of third game displays corresponding to a plurality of third games;

determining a third outcome of the first game;

determining second outcomes of the plurality of second games;

determining first outcomes of the plurality of third games;

providing awards based on at least one of the first outcome of the first game, the second outcome of the first game, the third outcome of the first game, the first outcomes of the plurality of second games, the second outcomes of the plurality of second games, and the first outcomes of the plurality of third games.

22. The gaming method of claim 21, wherein displaying the first game display, the plurality of second game displays, and the plurality of third game displays on the single display screen comprises displaying a number of third game displays greater than the number of second game displays in the plurality of second game displays.

23. The gaming method of claim 21, wherein the first condition comprises achieving a specific game outcome associated with the first game.

24. The gaming method of claim 21, wherein the first condition comprises a level of winning associated with the first game.

25. The gaming method of claim 21, further comprising:

if a third condition is satisfied, displaying the first game display, the plurality of second game displays, the plurality of third game displays on the single display screen at the same time, and a plurality of fourth game displays on the single display screen at the same time, the plurality of fourth game displays corresponding to a plurality of fourth games;

determining a fourth outcome of the first game;

determining third outcomes of the plurality of second games;

determining second outcomes of the plurality of third games;

determining outcomes of the plurality of fourth games;

wherein, if the third condition is satisfied, providing awards is further based on the fourth outcome of the first game, the third outcomes of the plurality of second games, the second outcomes of the plurality of third games, and the outcomes of the plurality of fourth games.

26. A gaming method, comprising:

receiving a wager from a first person;

displaying at least one locally played game and at least one remotely played game on a single display screen of a gaming apparatus at the same time, wherein the at least one locally played game is played by a first person at the gaming apparatus, and wherein the at least one remotely played game is played by a second person at a location remote to the first person; and determining a value payout associated with at least an outcome of the at least one locally played game.

27. A gaming method as defined in claim 26, further comprising providing input, via an input device of the gaming apparatus, to the at least one remotely played game.

28. A gaming method as defined in claim 26, further comprising accepting a wager on the at least one remotely played game from the first person via an input device of the gaming apparatus.

29. A gaming method as defined in claim 26, wherein the at least one locally played game and the at least one remotely played game are independently operable.

30. A gaming method as defined in claim 26, wherein the value payout is associated with outcomes of the at least one locally game and the at least one remotely played game.

31. A gaming method as defined in claim 30, further comprising apportioning the value payout between the first person and the second person.

32. A gaming method as defined in claim 26, wherein the remotely played game displayed on the display screen is the same game image that is displayed on a display screen of the remote gaming apparatus.

33. A gaming method as defined in claim 26, wherein displaying the at least one locally played game and the at least one remotely played game on the single display screen comprises displaying each of the at least one locally played game and the at least one remotely played game in a separate graphical window on the single display screen.

34. A gaming method as defined in claim 26, wherein displaying the at least one locally played game and the at least one remotely played game on the single display screen comprises displaying each of the at least one locally played game and the at least one remotely played game on a separate, separately controllable sub-array of the single display screen.

35. A gaming method, comprising:

accepting a wager for initiating play of a plurality of games, the plurality of games including at least a first game and a second game;

displaying the plurality of games on a single display screen at the same time; and determining at least a first outcome of the first game and a second outcome of the second game;

providing a bonus in response to a combination of at least the first outcome and the second outcome.

36. A gaming method as defined in claim 35, wherein providing the bonus comprises activating at least one bonus game.

37. A gaming method as defined in claim 35, wherein providing the bonus comprises activating a multiplier, the multiplier to multiply a value payout associated with at least one outcome of at least the one game of the plurality of games.

38. A gaming method as defined in claim 35, wherein providing the bonus comprises providing a relatively more valuable bonus if the first outcome and the second outcome are simultaneous, rather than non-simultaneous.

39. A gaming method as defined in claim 35, wherein providing the bonus comprises qualifying the player for entry into a tournament game.

40. A gaming method as defined in claim 35, wherein displaying the plurality of games comprises displaying each game of the plurality of games in a separate graphical window on the single display screen.

41. A gaming method as defined in claim 35, wherein displaying the plurality of games comprises displaying each game of the plurality of games on a separate, separately controllable sub-array of the single display screen.

* * * * *

UNITED STATES PATENT AND TRADEMARK OFFICE

CERTIFICATE OF CORRECTION

PATENT NO. : 6,860,810 B2
DATED : March 1, 2005
INVENTOR(S) : Lee E. Cannon et al.

It is certified that error appears in the above-identified patent and that said Letters Patent is hereby corrected as shown below:

Title page,
Item [57], ABSTRACT,
Line 7, replace "payable" with -- playable --.

Signed and Sealed this

Sixteenth Day of August, 2005

JON W. DUDAS
*Director of the United States Patent and Trademark Office*